United States Patent
Sato

(10) Patent No.: US 7,170,712 B2
(45) Date of Patent: Jan. 30, 2007

(54) MAGNETIC HEAD INCLUDING A GAP-DEPTH DEFINING LAYER ON PROTRUDING LAYER AND METHOD FOR MANUFACTURING THE SAME

(75) Inventor: Kiyoshi Sato, Niigata-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 423 days.

(21) Appl. No.: 10/795,786

(22) Filed: Mar. 8, 2004

(65) Prior Publication Data
US 2004/0179296 A1 Sep. 16, 2004

(30) Foreign Application Priority Data
Mar. 12, 2003 (JP) .............................. 2003-066221

(51) Int. Cl.
G11B 5/17 (2006.01)
G11B 5/23 (2006.01)

(52) U.S. Cl. ........................ 360/126; 360/123

(58) Field of Classification Search ............... 360/123, 360/126
See application file for complete search history.

(56) References Cited

U.S. PATENT DOCUMENTS 6,898,055 B2 * 5/2005 Sato et al. .................. 360/126
6,898,056 B2 * 5/2005 Sato et al. .................. 360/126
7,042,677 B2 * 5/2006 Ohtomo et al. ............. 360/126
7,062,839 B2 * 6/2006 Sasaki et al. ............ 29/603.15

FOREIGN PATENT DOCUMENTS

JP 2001-319311 11/2001
JP 2002-008207 1/2002

OTHER PUBLICATIONS

Notification of Reasons for Refusal dated May 2, 2006, for corresponding Japanese Patent Application No. 2003-066221.

* cited by examiner

Primary Examiner—Jefferson Evans
(74) Attorney, Agent, or Firm—Brinks Hofer Gilson & Lione

(57) ABSTRACT

A recording thin-film magnetic head includes a gap-depth defining layer, lower magnetic pole layers and gap layers on the front and rear sides of the gap-depth defining layer, and an upper magnetic pole layer. The entire top surface of the gap-depth defining layer is covered with a first seed layer. The rear end surfaces of the lower magnetic pole layer and the gap layer on the front side are in contact with the front end surface of the gap-depth defining layer. The upper magnetic pole layer is formed on the gap layers by plating.

36 Claims, 15 Drawing Sheets

MAGNETIC HEAD INCLUDING A GAP-DEPTH DEFINING LAYER ON PROTRUDING LAYER AND METHOD FOR MANUFACTURING THE SAME

This application claims the benefit of priority to Japanese Patent Application No. 2003-066221, herein incorporated by reference.

BACKGROUND OF THE INVENTION

1. Field of the Invention

The present invention relates to recording thin-film magnetic heads for use in, for example, floating magnetic head devices and their manufacturing methods. In particular, the present invention relates to a thin-film magnetic head that can precisely define tracks having a predetermined width, be properly compatible with narrower tracks, have a shorter magnetic path, and prevent flux leakage to improve the recording characteristics, and its manufacturing method.

2. Description of the Related Art

FIG. 28 is a longitudinal sectional view of a known thin-film magnetic head, where X indicates a track-width direction; Y indicates a height direction of the magnetic head; and Z indicates a traveling direction of the magnetic head over a magnetic recording medium such as a hard disc. The front surface (the leftmost surface in the drawing) of this magnetic head parallel to plane X-Z faces the recording medium.

In FIG. 28, a lower core layer 6, which is made of, for example, Ni—Fe alloy, has a protrusion 6a extending upward (in the Z direction in the drawing) along the front surface of the magnetic head. A back gap layer 7 of a magnetic material is formed on the lower core layer 6 at the rear of the magnetic head in the height direction (in the Y direction in the drawings). The space between the protrusion 6a and the back gap layer 7 on the lower core layer 6 includes some portions of a coil layer 8 of, for example, copper, and is filled with an insulating layer 9. The protrusion 6a, the insulating layer 9, and the back gap layer 7 have flat top surfaces 6b, 9a, and 7a, respectively.

A gap layer 10 of, for example, Al$_2$O$_3$ is formed on the top surfaces 6b and 9a of the protrusion 6a and the insulating layer 9. A nonmagnetic layer 12 is formed on this gap layer 10 away from the front surface of the magnetic head in the height direction by a predetermined distance. An upper magnetic pole layer 11 is further formed over the top surfaces of the gap layer 10, the nonmagnetic layer 12, and the back gap layer 7.

Such a thin-film magnetic head is disclosed in, for example, Japanese Unexamined Patent Application Publication No. 2001-319311.

In recent years, smaller thin-film magnetic heads and higher-speed magnetic head devices have been developed with higher recording densities and higher frequency. This trend imposes more severe requirements on thin-film magnetic heads.

In the magnetic head shown in FIG. 28, a seed layer 13 for plating the upper magnetic pole layer 11 is substantially separated into a seed layer 13a formed on the nonmagnetic layer 12 and a seed layer 13b formed on the protrusion 6a of the lower core layer 6. These seed layers 13a and 13b are spaced in the height direction by a distance S.

Smaller magnetic heads demand that the upper magnetic pole layer 11 have a smaller thickness. Unfortunately, if the seed layer 13 is substantially separated, such a thin upper magnetic pole layer 11 cannot be reliably formed on the nonmagnetic layer 12.

Smaller magnetic heads have difficulty in connecting an electrode to the seed layer 13a on the nonmagnetic layer 12 during their formation. Therefore, the electrode is connected to the seed layer 13b on the protrusion 6a to form the upper magnetic pole layer 11 on the seed layer 13b by plating. This upper magnetic pole layer 11 is allowed to grow until it extends over the nonmagnetic layer 12 and reaches the seed layer 13a.

If the upper magnetic pole layer 11 reaches the seed layer 13a, current can be passed through the seed layer 13a to grow the upper magnetic pole layer 11 entirely over the seed layer 13a. However, if the upper magnetic pole layer 11 has a small thickness, it may fail to reach the seed layer 13a. Then, as shown in FIG. 29, the upper magnetic pole layer 11 cannot be formed over the nonmagnetic layer 12, thus producing a magnetic head that cannot perform magnetic recording or, even if possible, that has significantly poor recording characteristics.

As described above, this magnetic head cannot be properly compatible with higher recording densities and higher frequency in future, nor can it improve the recording characteristics.

SUMMARY OF THE INVENTION

Accordingly, embodiments of the present invention is to provide a thin-film magnetic head that can be properly compatible with narrower tracks, have a shorter magnetic path, and improve the recording characteristics.

Embodiments of the present invention also provide an easy method for manufacturing this magnetic head.

The present invention provides a thin-film magnetic head including a lower core layer extending from the front surface of the magnetic head in the height direction of the magnetic head, the front surface facing a recording medium; a protruding layer formed on the lower core layer, extending from the front surface of the magnetic head in the height direction by a predetermined length; a back gap layer formed on the lower core layer away from the rear end surface of the protruding layer in the height direction by a predetermined distance; a coil layer that is at least partially included in a space surrounded by the lower core layer, the protruding layer, and the back gap layer; a coil-insulating layer covering the coil layer; a gap-depth defining layer composed of a nonmagnetic material and disposed on the top surface of the protruding layer away from the front surface of the magnetic head in the height direction by a predetermined distance; a first seed layer composed of a metal, covering the entire top surface of the gap-depth defining layer; a lower magnetic pole layer formed on the protruding layer on the front side of the gap-depth defining layer, the rear end surface of the lower magnetic pole layer being in contact with the front end surface of the gap-depth defining layer; a gap layer formed on the lower magnetic pole layer, the rear end surface of the gap layer being in contact with the front end surface of the gap-depth defining layer; and an upper magnetic pole layer connected to the back gap layer through the top surfaces of the gap layer and the gap-depth defining layer.

This magnetic head has two features. The first feature is that the gap-depth defining layer of a nonmagnetic material is disposed on the top surface of the protruding layer away from the front surface of the magnetic head in the height direction by a predetermined distance; and that the first seed layer of a metal covers the entire top surface of the gap-depth defining layer. The second feature is that the lower magnetic pole layer and the gap layer, in this order, are formed on the protruding layer on the front side of the gap-depth defining layer; that the rear end surfaces of the lower magnetic pole layer and the gap layer are in contact with the front end surface of the gap-depth defining layer; and that the upper magnetic pole layer is connected to the back gap layer through the top surfaces of the gap layer and the gap-depth defining layer.

According to the first feature, the first seed layer, covering the entire top surface of the gap-depth defining layer, allows reliable formation of the upper magnetic pole layer over the gap-depth defining layer, providing a magnetic head having stable recording characteristics.

According to the second feature, the upper magnetic pole layer, which is formed on the gap layer disposed on the lower magnetic pole layer, may be allowed to grow from a level closer to the first seed layer by plating. This ensures that the upper magnetic pole layer reaches the first seed layer to cover the gap-depth defining layer, providing a magnetic head having stable recording characteristics.

The front end surfaces of the gap-depth defining layer and the first seed layer are preferably continuous. Such continuous surfaces allow the upper magnetic pole layer to reach the first seed layer more reliably.

The front end surface of the gap-depth defining layer is preferably perpendicular to the top surface of the protruding layer. Such a perpendicular surface allows precise definition of the gap depth of the magnetic head, provides less side fringing than one curved or not perpendicular to the top surface of the protruding layer, and allows the upper magnetic pole layer to reach the first seed layer more reliably. Side fringing is a phenomenon in which a recording magnetic field occurs outside a predetermined track width.

The total thickness of the gap-depth defining layer and the first seed layer is preferably 0.5 µm or less. Such thicknesses can increase the magnetic flux passing through the upper magnetic pole layer, the lower magnetic pole layer, and the lower core layer.

The nonmagnetic material for the gap-depth defining layer may be selected from the group consisting of $SiO_2$, SiN, $Ta_2O_5$, $Si_3N_4$, and a resist.

The top surfaces of the protruding layer, the coil-insulating layer, and the back gap layer are preferably flat and continuous.

Such flat top surfaces allow the upper magnetic pole layer, the gap layer, and the upper magnetic pole layer to have a predetermined shape and enable precise definition of a predetermined track width, which is a width of the upper magnetic pole layer at the front surface of the magnetic head. These advantages lead to a thin-film magnetic head properly compatible with higher recording densities.

In addition, the upper magnetic pole layer, the gap layer, and the upper magnetic pole layer can provide a shorter magnetic path because these layers are formed on the flat top surfaces. Therefore, even if the coil layer has a smaller number of turns, the magnetic head can retain its recording characteristics. A smaller number of turns can decrease the coil resistance, thereby preventing heat generation in the magnetic head during operation and, for example, the protrusion of the gap layer from the front surface of the magnetic head.

This magnetic head preferably further includes another lower magnetic pole layer and another gap layer on the coil-insulating layer on the rear side of the gap-depth defining layer.

The lower magnetic pole layer and gap layer on the rear side allow the upper magnetic pole layer to be flat and provide a shorter magnetic path.

In this manufacturing method, the lower magnetic pole layer, the gap layer, and the upper magnetic pole layer may have the same planar shape. Then, the width of the upper magnetic pole layer at the front surface of the magnetic head determines a track width.

The rear end surface of the gap-depth defining layer may be positioned on the protruding layer, the coil-insulating layer, or the back gap layer.

The lower magnetic pole layer, the gap layer, and the upper magnetic pole layer are preferably formed by plating to form the upper magnetic pole layer on the gap layer continuously and to facilitate the connection between the upper magnetic pole layer and the first seed layer.

In addition, plating eliminates the need for trimming the upper magnetic pole layer to achieve narrower tracks.

Preferably, this magnetic head further includes an upper core layer on the upper magnetic pole layer; the upper core layer has the same planar shape as the upper magnetic pole layer; and the upper and lower magnetic pole layers have a higher saturation magnetic flux density than the upper core layer.

This upper core layer can be directly formed on the upper magnetic pole layer in the present invention. The top surface of the upper magnetic pole layer, which is substantially flat, allows precise formation of the upper core layer having a predetermined shape.

In addition, the upper and lower magnetic pole layers, if having a higher saturation magnetic flux density than the upper core layer, can increase the magnetic flux efficiency to improve the recording characteristics.

The upper and lower magnetic pole layers preferably have a higher saturation magnetic flux density than the lower core layer, the protruding layer, and the back gap layer.

The planar shape of the upper magnetic pole layer is preferably composed of a front portion having a width that corresponds to the track width at the front surface of the magnetic head and that remains constant or increases in the height direction; and a rear portion having a width that increases from the side base ends at the rear of the front portion in the height direction. Such an upper magnetic pole layer can concentrate a magnetic flux on the front portion, which functions as a magnetic pole, and can increase the magnetic flux efficiency at the rear portion, which functions as a yoke.

Preferably, this magnetic head further includes a second seed layer of a magnetic material, and the lower magnetic pole layer is formed on the protruding layer with the second seed layer disposed therebetween.

The second seed layer, which is exposed in the front surface of the magnetic head, needs to be made of a magnetic material. The second seed layer, if made of a nonmagnetic metal, acts as a pseudogap.

Preferably, this magnetic head further includes a third seed layer extending from the rear end surface of the gap-depth defining layer onto the back gap layer; the second and third seed layers are separately formed; the gap-depth defining layer is disposed between the second and third seed layers; and another lower magnetic pole layer and another gap layer are formed on the third seed layer. Then, the third seed layer may be made of a nonmagnetic metal.

The coil layer may surround the back gap layer on a plane parallel to the top surface of the lower core layer. Alternatively, the coil layer may helically surround the upper magnetic pole layer or the lower core layer.

The present invention further provides a method for manufacturing a thin-film magnetic head. This method includes the steps of (a) forming a lower core layer extending from the front surface of the magnetic head in the height direction of the magnetic head, the front surface of the magnetic head facing a recording medium; (b) forming a coil-insulating seed layer on the lower core layer; and a coil layer at predetermined areas on the coil-insulating seed layer; (c) forming a protruding layer and a back gap layer on the lower core layer before or after step (b), the protruding layer extending from the front surface of the magnetic head to a position not in contact with the front end surface of the coil layer in the height direction; and the back gap layer being separated from the rear end surface of the protruding layer in the height direction such that the back gap layer is not in contact with the coil layer; (d) covering the coil layer with a coil-insulating layer; (e) forming a nonmagnetic material layer and a first seed layer on the protruding layer, the coil-insulating layer, and the back gap layer; (f) patterning the first seed layer into a predetermined shape such that the first seed layer is separated from the front surface of the magnetic head by a predetermined distance; (g) removing a portion of the nonmagnetic material layer uncovered by the patterned first seed layer to form a gap-depth defining layer; and (h) forming a lower magnetic pole layer on the protruding layer on the front side of the gap-depth defining layer such that the rear end surface of the lower magnetic pole layer is in contact with the front end surface of the gap-depth defining layer; a gap layer on the lower magnetic pole layer such that the rear end surface of the gap layer is in contact with the front end surface of the gap-depth defining layer; and an upper magnetic pole layer connected to the back gap layer through the top surfaces of the gap layer and the gap-depth defining layer.

According to this manufacturing method, the first seed layer, which serves as a mask for processing the nonmagnetic material layer to form the gap-depth defining layer at step (g), can cover the entire top surface of the gap-depth defining layer.

Therefore, at step (h), the upper magnetic pole layer can be readily formed over the first seed layer, providing a magnetic head having stable recording characteristics.

Additionally, at step (h), the upper magnetic pole layer, which is formed on the gap layer disposed on the lower magnetic pole layer, may be allowed to grow from a level closer to the first seed layer by plating. This ensures that the upper magnetic pole layer reaches the first seed layer to cover the gap-depth defining layer, providing a magnetic head having stable recording characteristics.

At step (b), the coil layer, if having a helical shape, is only partially formed on the coil-insulating seed layer, as will be described later in detail.

At step (g), the gap-depth defining layer and the first seed layer may be formed such that the front end surfaces thereof are continuous, that is, are formed in the same flat plane or the same curved plane.

At step (g), the gap-depth defining layer is preferably formed such that the front end surface thereof is perpendicular to the top surface of the protruding layer.

If the front end surface of the gap-depth defining layer is perpendicular to the top surface of the protruding layer, the upper magnetic pole layer need not extend over the gap-depth defining layer to reach the first seed layer. Thus, the upper magnetic pole layer can reliably reach the first seed layer.

Preferably, at step (e), the nonmagnetic material layer is formed with a material selected from the group consisting of $SiO_2$, SiN, $Ta_2O_5$, $Si_3N_4$, and a resist; and, at step (g), the uncovered portion of the nonmagnetic material layer is removed by reactive ion etching. Through such steps (e) and (g), the gap-depth defining layer can be formed such that the front end surface thereof is perpendicular to the top surface of the protruding layer.

At step (e), the nonmagnetic material layer and the first seed layer are preferably formed such that the total thickness thereof is 0.5 µm or less. Such thicknesses can increase the magnetic flux passing through the upper magnetic pole layer, the lower magnetic pole layer, and the lower core layer.

At step (d), the top surfaces of the protruding layer, the coil-insulating layer, and the back gap layer are preferably processed into a continuous, flat surface after the coil layer is covered with the coil-insulating layer.

Such a continuous, flat surface can facilitate precise formation of the three-layer structure of the lower magnetic pole layer, the gap layer, and the upper magnetic pole layer having a predetermined shape, providing a thin-film magnetic head properly compatible with higher recording densities.

At step (h), the lower magnetic pole layer, the gap layer, and the upper magnetic pole layer are preferably continuously formed by plating. Such continuous plating facilitates the formation of the three-layer structure having a predetermined shape and, particularly, to enable precise definition of the track width.

Preferably, this manufacturing method further includes a step of continuously forming an upper core layer on the upper magnetic pole layer by plating after step (h), at which the upper and lower magnetic pole layers are formed with a material having a higher saturation magnetic flux density than the upper core layer.

At step (h), the upper and lower magnetic pole layers are preferably formed with a material having a higher saturation magnetic flux density than the lower core layer, the protruding layer, and the back gap layer.

In the present invention, the lower magnetic pole layer, the gap layer, the upper magnetic pole layer, and the upper core layer can be formed on the flat surface described above, providing broad options for the materials for the individual layers. Therefore, the lower and upper magnetic pole layers, which function as a magnetic pole at the front surface of the magnetic head, may be made of a material having high saturation magnetic flux density. Furthermore, another lower magnetic pole layer may be formed on the rear side of the gap-depth defining layer, and the upper magnetic pole layer may extend to the rear side of the gap-depth defining layer. These lower and upper magnetic pole layers, which function as a yoke on the rear side of the gap-depth defining layer, also have high saturation magnetic flux density, providing a thin-film magnetic head having excellent magnetic flux efficiency.

At step (h), preferably, the upper magnetic pole layer is formed in a planar shape composed of a front portion having a width that corresponds to the track width at the front surface of the magnetic head and that remains constant or increases in the height direction; and a rear portion having a width that increases from the side base ends at the rear of the front portion in the height direction, and the lower magnetic pole layer, the gap layer, and the upper core layer are formed in the same planar shape as the upper magnetic pole layer.

At step (f), the first seed layer is preferably patterned such that the rear end surface thereof is positioned above any one of the top surfaces of the protruding layer, the coil-insulating layer, and the back gap layer. Thereby, the gap-depth defining layer may also be patterned such that its rear end surface is positioned above any one of the top surfaces of the protruding layer, the coil-insulating layer, and the back gap layer.

This manufacturing method preferably further includes a step of forming a second seed layer of a magnetic material on the protruding layer between steps (d) and (e).

In addition, preferably, this manufacturing method further includes between steps (d) and (e) a step of forming a third seed layer such that it is disposed between the rear end surface of the gap-depth defining layer and the front end surface of the back gap layer; at step (f), the first seed layer is patterned to remain above the area between the protruding layer and the third seed layer; and, at step (h), another lower magnetic pole layer and another gap layer are formed on the third seed layer by plating.

If the first seed layer is patterned to remain above the area between the protruding layer and the third seed layer at step (f), the gap-depth defining layer is formed at step (g) to bridge the protruding layer and the third seed layer. The third seed layer is exposed after the formation of the gap-depth defining layer. Therefore, the additional lower magnetic pole layer and gap layer can be formed on the third seed layer by plating at step (h).

The third seed layer may be formed with a nonmagnetic metal.

The coil layer may be formed so as to surround the back gap layer on a plane parallel to the top surface of the lower core layer. Alternatively, the coil layer may be formed in a helical shape composed of first coil segments in a space surrounded by the lower core layer, the protruding layer, and the back gap layer, the first coil segments extending in a direction crossing the height direction; and second coil segments on the upper magnetic pole layer with an insulating layer disposed therebetween, the second coil segments extending in a direction crossing the height direction. Then, ends of the first coil segments opposed to ends of the second coil segments in the thickness direction of the upper magnetic pole layer may be connected to the ends of the second coil segments.

DESCRIPTION OF THE PREFERRED EMBODIMENTS

Figure 1:
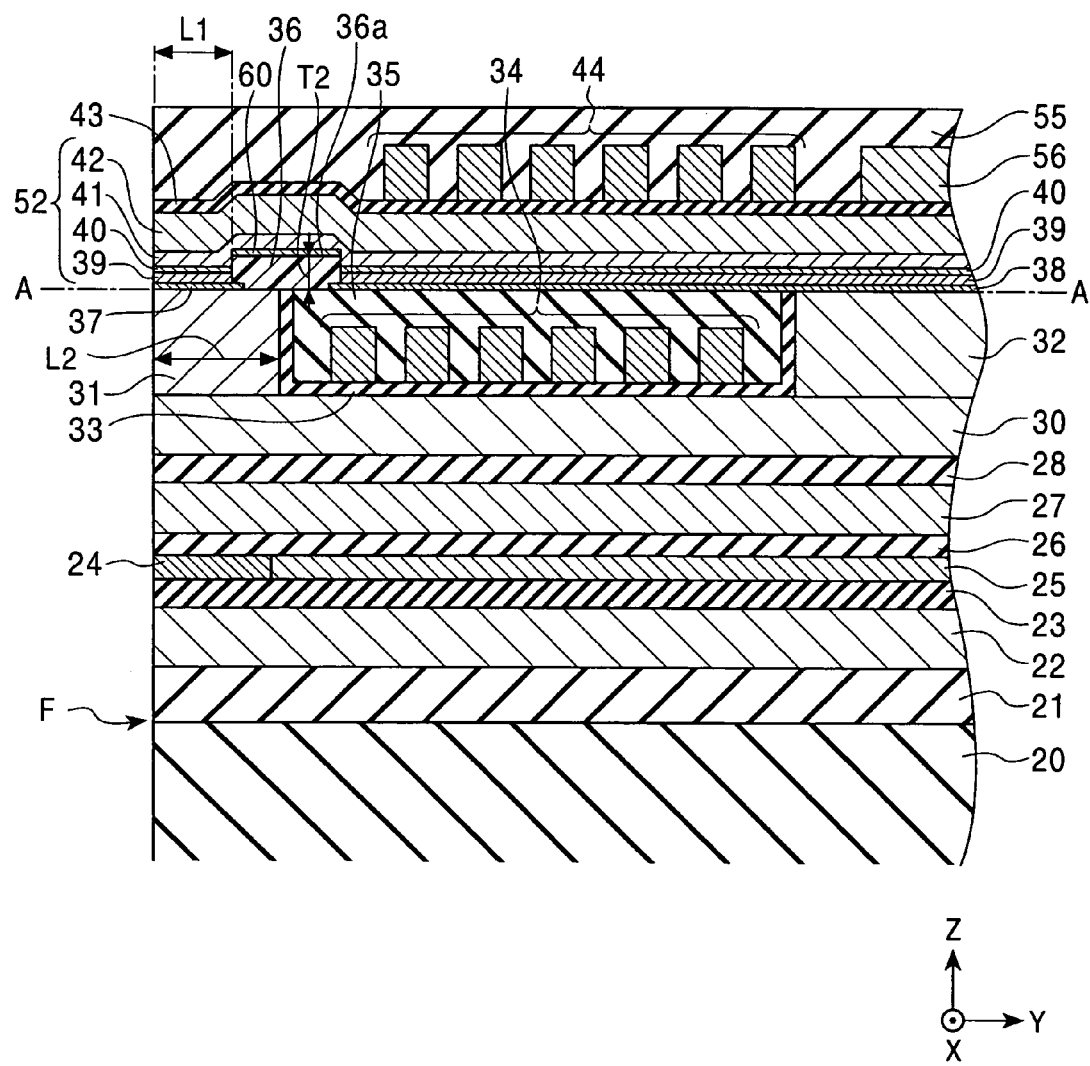
FIG. 1 is a longitudinal sectional view of a magnetic head according to a first embodiment of the present invention.

FIG. 1 is a longitudinal sectional view of a thin-film magnetic head according to a first embodiment of the present invention.

In the drawings, X indicates a track-width direction; Y indicates a height direction of magnetic heads orthogonal to the track-width direction; and Z indicates a traveling direction of the magnetic heads over a recording medium (magnetic disc). In FIG. 1, F indicates the front surface (the leftmost surface in the drawing) of the magnetic head. This front surface faces the recording medium.

An $Al_2O_3$ layer 21 is formed on a substrate 20 of, for example, alumina-titanium carbide ($Al_2O_3$—TiC).

A lower shield layer 22 of, for example, Ni—Fe alloy or sendust is formed on this $Al_2O_3$ layer 21, and a lower gap layer 23 of, for example, $Al_2O_3$ is formed on this lower shield layer 22.

A magnetoresistive device 24, typically a giant magnetoresistive (GMR) device such as a spin-valve thin-film device, is formed on this lower gap layer 23 near the front surface of the magnetic head. An electrode layer 25 extends from both sides of this magnetoresistive device 24 in the track-width direction (the X direction in the drawings) to the rear of the magnetic head in the height direction (the Y direction in the drawings).

An upper gap layer 26 of, for example, $Al_2O_3$ is formed on the magnetoresistive device 24 and the electrode layer 25, and an upper shield layer 27 of, for example, Ni—Fe alloy is formed on this upper gap layer 26.

The above-described layers from the lower shield layer 22 to the upper shield layer 27 are collectively referred to as a read head (MR head).

A separating layer 28 of, for example, $Al_2O_3$ is formed on the upper shield layer 27. The magnetic head of the present invention need not include the upper shield layer 27 and the separating layer 28. Without these two layers 27 and 28, a lower core layer 30, which will be described below, may be directly formed on the upper gap layer 26. Then, the lower core layer 30 concurrently functions as the upper shield layer 27.

On the other hand, with the two layers 27 and 28, the lower core layer 30 is formed on the separating layer 28. This lower core layer 30 is made of a magnetic material such as Ni—Fe alloy and has a predetermined length from the front surface of the magnetic head in the height direction (in the Y direction in the drawings).

A protruding layer 31 is formed on this lower core layer 30, having a predetermined length L2 from the front surface of the magnetic head in the height direction (in the Y direction in the drawings). In addition, a back gap layer 32 is formed on the lower core layer 30 away from the rear end surface of the protruding layer 31 in the height direction (in the Y direction in the drawings) by a predetermined distance.

The protruding layer 31 and the back gap layer 32 are made of a magnetic material, which may be the same as or different from that of the lower core layer 30. These layers 31 and 32 may each be formed in a monolayer or a multilayer, and are magnetically connected to the lower core layer 30.

A coil-insulating seed layer 33 of an insulating material such as $Al_2O_3$ and $SiO_2$ is formed in a space surrounded by the lower core layer 30, the protruding layer 31, and the back gap layer 32. First coil segments 34 are formed on this coil-insulating seed layer 33, crossing the height direction.

Figure 3:
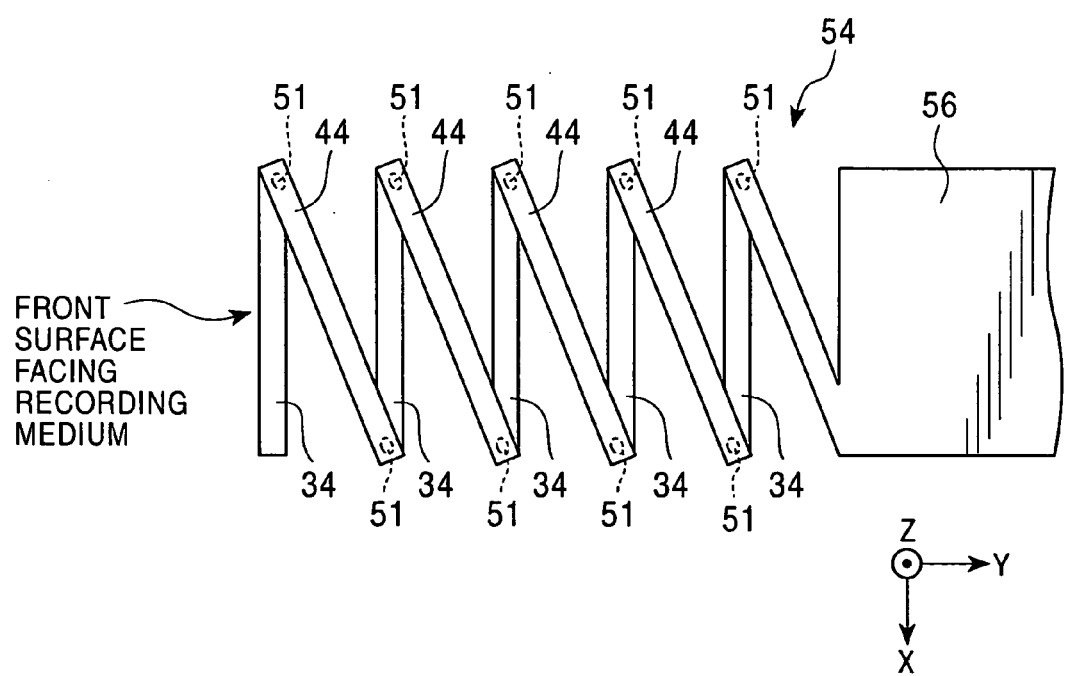
FIG. 3 is a partial plan view of a coil layer in the magnetic head in FIG. 2.

Viewed from above, as shown in FIG. 3, these first coil segments 34 are parallel to the track-width direction (the X direction in the drawings). The space accommodating the first coil segments 34 is filled with a coil-insulating layer 35 of, for example, $Al_2O_3$.

The first coil segments 34, which extend in a direction crossing the height direction, may be nonparallel. In addition, these first coil segments 34 may be linear, curved, or bent.

The top surfaces of the protruding layer 31, the coil-insulating layer 35, and the back gap layer 32 form a continuous, flat surface along a reference plane A in FIG. 1.

A gap-depth defining layer 36 is formed on this flat surface, extending from a position separated from the front surface of the magnetic head in the height direction (in the Y direction in the drawings) by a minimum length L1. This gap-depth defining layer 36 is made of a material selected from the group consisting of $SiO_2$, SiN, $Ta_2O_5$, $Si_3N_4$, and a resist.

In this embodiment, a front end surface 36b (see also FIG. 4) of the gap-depth defining layer 36 is disposed above the protruding layer 31 while a rear end surface 36c (see also FIG. 4) of the gap-depth defining layer 36 is disposed above the coil-insulating layer 35.

A second seed layer 37 of a magnetic material is formed on the protruding layer 31. In addition, a third seed layer 38 extends from the rear end surface 36c of the gap-depth defining layer 36 to the top surface of the back gap layer 32. The second and third seed layers 37 and 38 are separately formed.

The gap-depth defining layer 36 is disposed between the second and third seed layers 37 and 38.

The second and third seed layers 37 and 38 are made of, for example, $Ni_{40}Fe_{60}$, $Fe_{70}Co_{30}$, or $Fe_{60}Co_{30}Ni_{10}$, which have saturation magnetic flux densities of about 1.9 T, about 2.3 T, and about 2.1 T, respectively. These seed layers 37 and 38 may be formed by sputtering to provide a sufficient corrosion resistance.

A lower magnetic pole layer 39 and a gap layer 40, in this order, are formed on the protruding layer 31 with the second seed layer 37 disposed therebetween, extending from the front surface of the magnetic head to the front end surface 36b of the gap-depth defining layer 36. On the other hand, another lower magnetic pole layer 39 and another gap layer 40, in this order, are formed on the coil-insulating layer 35 and the back gap layer 32 with the third seed layer 38 disposed therebetween, extending from the rear end surface 36c of the gap-depth defining layer 36 in the height direction. The lower magnetic pole layers 39 and the gap layers 40 on the front and rear sides are formed by plating in this embodiment.

An upper magnetic pole layer 41 is formed on the gap layers 40 and the gap-depth defining layer 36 by plating, and an upper core layer 42 is formed on this upper magnetic pole layer 41 by plating. The upper magnetic pole layer 41 is connected to the back gap layer 32 through the top surface 36a of the gap-depth defining layer 36.

An insulating layer 43 of an insulating material such as $Al_2O_3$ and a resist is formed on a four-layer structure 52 composed of the lower magnetic pole layers 39, the gap layers 40, the upper magnetic pole layer 41, and the upper core layer 42. Second coil segments 44 are formed on this insulating layer 43, extending in a direction crossing the height direction.

Viewed from above, as shown in FIG. 3, these second coil segments 44 are, for example, inclined with respect to the track-width direction (in the X direction in the drawings).

The second coil segments 44, which cross the height direction, may be nonparallel. In addition, the second coil segments 44 may be linear, curved, or bent.

Figure 2:
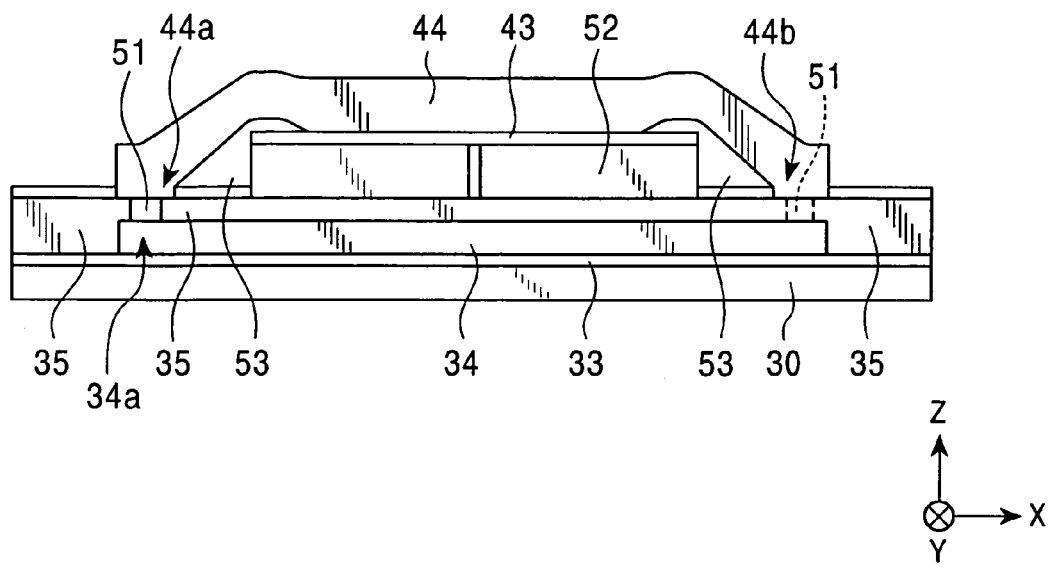
FIG. 2 is a partial front view of the magnetic head in FIG. 1.

The second coil segments 44 are nonparallel to the first coil segments 34. Referring to FIGS. 2 and 3, ends 34a of the first coil segments 34 opposed to ends 44a of the second coil segments 44 in the thickness direction of the four-layer structure 52 (in the Z direction in the drawing) are connected through connections 51 to the opposed ends 44a of the second coil segments 44. A connection 51 illustrated with a dotted line on the right in FIG. 2 connects an end 34a of a first coil segment 34 behind a first coil segment 34 visible in FIG. 2 and an end 44a of a second coil segment 44 visible in FIG. 2.

The connections 51 connect the first and second coil segments 34 and 44 to form a coil layer 54 in a helical shape. A protective layer 55 in FIG. 1 is made of, for example, $Al_2O_3$; a layer 53 is made of, for example, a resist; and a lead layer 56 in FIGS. 1 and 3 is formed at a step of forming the second coil segments 44.

The coil layer 54 can be formed in a helical shape because the four-layer structure 52 can be formed on the flat surface composed of the top surfaces of the protruding layer 31, the coil-insulating layer 35, and the back gap layer 32. Consequently, the top surface of the upper core layer 42 can also be flat, on which, therefore, the second coil segments 44 can be easily and precisely formed into a predetermined shape.

Figure 4:
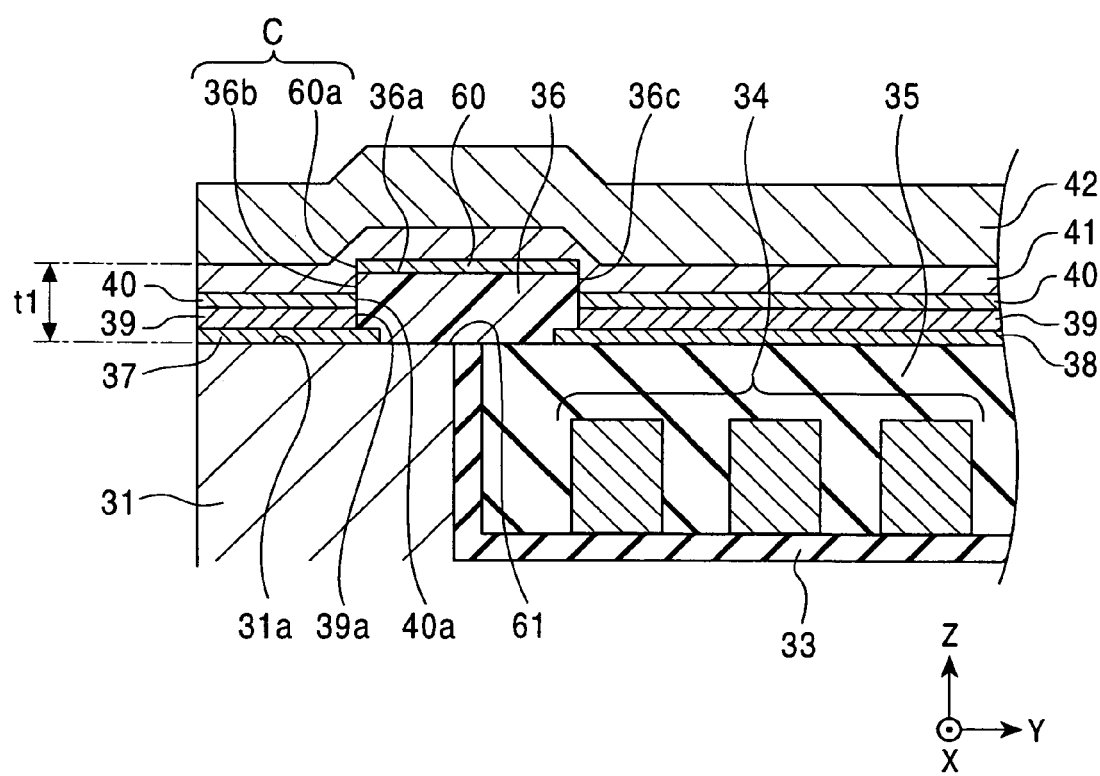
FIG. 4 is an enlarged partial longitudinal sectional view of the magnetic head in FIG. 1.

Features of the magnetic head in FIG. 1 will now be described with reference to FIG. 4, which is an enlarged partial sectional view of the magnetic head in FIG. 1 and shows the gap-depth defining layer 36 and its periphery. In FIG. 4, the same reference numerals as in FIG. 1 indicate the same parts as in FIG. 1 and, therefore, are not described.

A top surface 36a of the gap-depth defining layer 36 is entirely covered with a metallic first seed layer 60.

This first seed layer 60 is exemplified by nonmagnetic films such as Ti films and Ti/Au laminated films and magnetic films such as FeCo films and FeCo/Ti/Au laminated films. Among them, nonmagnetic films are preferred as the first seed layer 60 because nonmagnetic films have a higher corrosion resistance in a plating solution than magnetic films.

The gap-depth defining layer 36 entirely covered with the first seed layer 60 ensures reliable formation of the upper magnetic pole layer 41 on the gap-depth defining layer 36. That is, the upper magnetic pole layer 41 can be reliably connected to the back gap layer 32 through the top surface of the gap layer 40 on the front side and the top surface 36a of the gap-depth defining layer 36, providing a magnetic head having stable recording characteristics.

The gap-depth defining layer 36, if partially covered with a seed layer, poses a problem described below.

Figure 5:
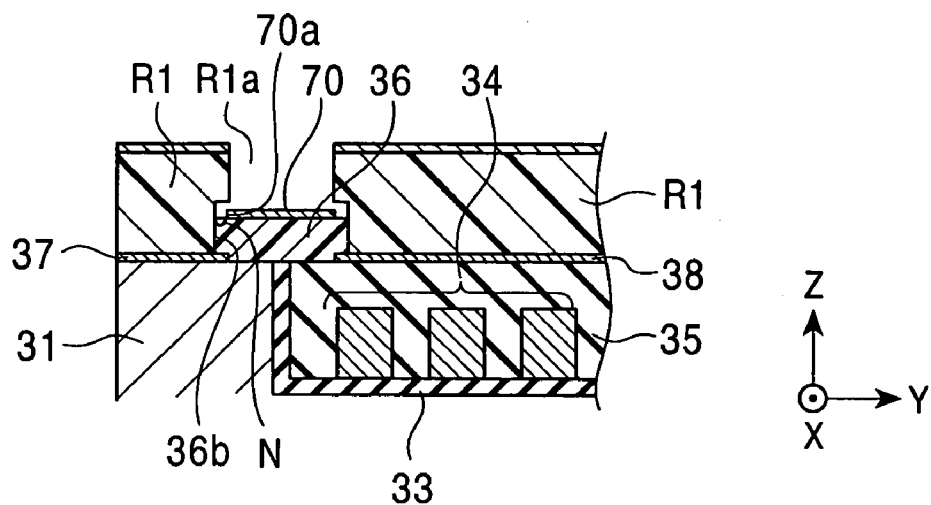
FIG. 5 is an enlarged partial longitudinal sectional view of a known magnetic head during manufacture.

Referring to FIG. 5, for example, after the formation of the second seed layer 37, the third seed layer 38, and the gap-depth defining layer 36, a resist layer R1 is applied on these layers 37, 38, and 36. This resist layer R1 is exposed and developed to form an opening R1a. Then, a metal is sputtered onto both of the top surface of the resist layer R1 and an exposed part of the top surface 36a of the gap-depth defining layer 36 in the opening R1a to deposit a seed layer 70 on the gap-depth defining layer 36.

This seed layer 70 only partially covers the top surface 36a of the gap-depth defining layer 36. Therefore, the front end surface 36b of the gap-depth defining layer 36 and the front end surface 70a of the seed layer 70 are not continuous and are separated by a discontinuous portion N.

Smaller magnetic heads have difficulty in connecting an electrode to the seed layer 70. Therefore, the electrode is connected to the second seed layer 37, and then the upper magnetic pole layer 39, the gap layer 40, and the upper magnetic pole layer 41 are formed on the second seed layer 37 by plating.

The upper magnetic pole layer 41 is allowed to grow and extend over the discontinuous portion N, which exposes the top surface 36a of the gap-depth defining layer 36. If the upper magnetic pole layer 41 reaches the seed layer 70 beyond the discontinuous portion N, current can be passed through the seed layer 70 to grow the upper magnetic pole layer 41 entirely over the seed layer 70.

Figure 6:
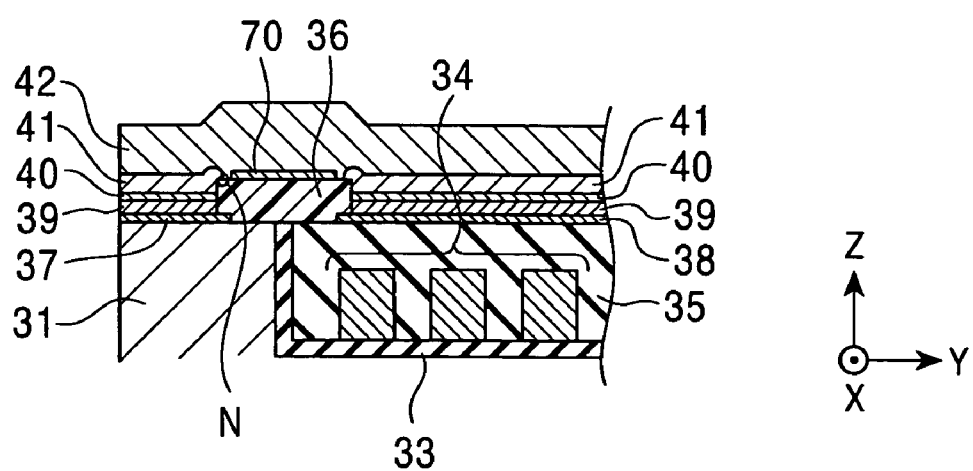
FIG. 6 is an enlarged partial longitudinal sectional view of the known magnetic head.

The size reduction of magnetic heads, a decrease in inductance, and the suppression of heat generated by eddy currents require that the upper magnetic pole layer 41 have a smaller thickness. However, if the upper magnetic pole layer 41 has a small thickness, it may fail to reach the seed layer 70. Then, as shown in FIG. 6, the upper magnetic pole layer 41 cannot be formed on the gap-depth defining layer 36 and, therefore, is separated by the gap-depth defining layer 36. This separation results in a magnetic head that cannot perform magnetic recording or, even if possible, that has significantly poor recording characteristics.

In FIG. 4, the lower magnetic pole layer 39 and the gap layer 40 on the front side are formed on the protruding layer 31. Rear end surfaces 39a and 40a of these layers 39 and 40 are in contact with the front end surface 36b of the gap-depth defining layer 36, which is made of an insulating material.

This contact provides the lower magnetic pole layer 39 and the gap layer 40 on the front side with flat top surfaces ranging from the front surface of the magnetic head to the front end surface 36b of the gap-depth defining layer 36.

Figure 7:
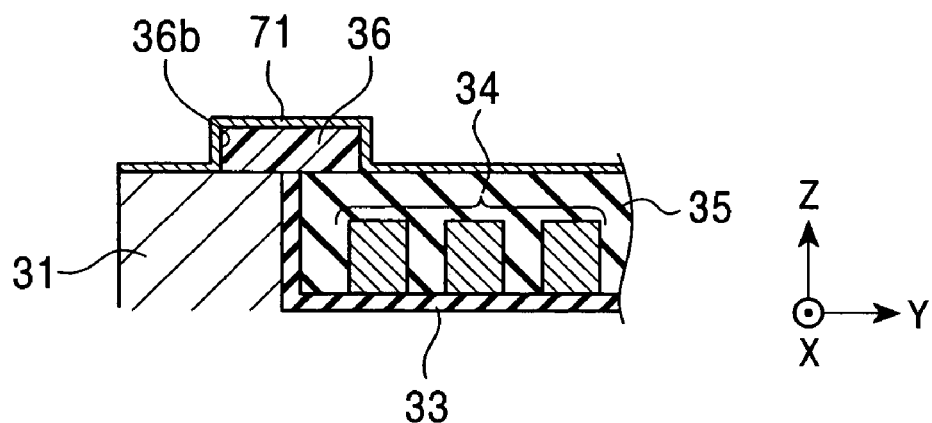
FIG. 7 is an enlarged partial longitudinal sectional view of another known magnetic head during manufacture.
Figure 8:
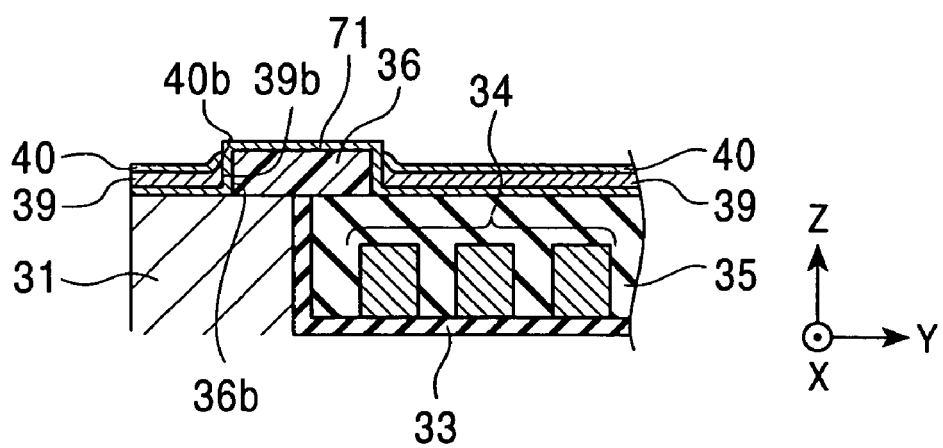
FIG. 8 is an enlarged partial longitudinal sectional view of the known magnetic head.

Referring to FIG. 7, for example, after the formation of the gap-depth defining layer 36, the protruding layer 31, the coil-insulating layer 35, and the gap-depth defining layer 36 are entirely covered with a metallic seed layer 71, which is also formed on the front end surface 36b of the gap-depth defining layer 36. Then, the lower magnetic pole layer 39 and the gap layer 40 on the front side grow unnecessarily from the seed layer 71 on the front end surface 36b by plating. Referring to FIG. 8, as a result, these layers 39 and 40 cause curved portions 39b and 40b near the gap-depth defining layer 36 and, therefore, cannot be flat, leading to a magnetic head having poor recording characteristics.

A method for forming the gap-depth defining layer 36 and its periphery in FIGS. 1 and 4 will be described later in detail.

In FIG. 4, the front end surface 36b of the gap-depth defining layer 36 and the front end surface 60a of the first seed layer 60 form a continuous surface C, which indicates that these front end surfaces 36b and 60a are formed in the same flat plane or the same curved plane.

The front end surface 36b of the gap-depth defining layer 36 is perpendicular to the top surface 31a of the protruding layer 31, allowing precise definition of the gap depth of the magnetic head. The gap depth has ascertain length of the plane between the gap layer 40 on the front side and the upper magnetic pole layer 41 in the height direction. The gap depth is a significant factor for the recording characteristics such as overwrite characteristics and non-linear transition shift (NLTS) characteristics, has a certain length of the plane between the gap layer 40 and the upper magnetic pole layer 41 in the height direction.

If the front end surface 36b of the gap-depth defining layer 36 is curved or not perpendicular to the top surface 31a of the protruding layer 31, the gap depth varies with changes in the thicknesses of the lower magnetic pole layer 39 and the gap layer 40 on the front side. On the other hand, in FIG. 1, if the front end surface 36b of the gap-depth defining layer 36 is perpendicular to the top surface 31a of the protruding layer 31, the gap depth is equal to the minimum length L1 from the front surface of the magnetic head to the gap-depth defining layer 36. The gap depth, therefore, is kept constant even if the lower magnetic pole layer 39 and the gap layer 40 on the front side change in thickness.

In addition, if the front end surface 36b of the gap-depth defining layer 36 is perpendicular to the top surface 31a of the protruding layer 31, it provides less side fringing than one curved or not perpendicular to the top surface 31a of the protruding layer 31. Side fringing is a phenomenon in which a recording magnetic field occurs outside a predetermined track width.

The upper magnetic pole layer 41 is formed on the gap layers 40 disposed on the lower magnetic pole layers 39. The upper magnetic pole layer 41, therefore, may be allowed to grow from a level closer to the first seed layer 60 by plating. Therefore, the upper magnetic pole layer 41, even if it has a small thickness, can reliably reach the first seed layer 60.

The total thickness t1 of the gap-depth defining layer 36 and the first seed layer 60 is preferably 0.5 μm or less to increase the magnetic flux passing through the upper magnetic pole layer 41, the lower magnetic pole layers 39, and the lower core layer 30.

As described above, the top surfaces of the protruding layer 31, the coil-insulating layer 35, and the back gap layer 32 form a flat surface, on which the four-layer structure 52 is formed by plating.

This flat surface allows precise formation of the four-layer structure 52 having a predetermined shape. In particular, the flat surface allows precise definition of a track width Tw (see also FIG. 9), which is a width of the upper magnetic pole layer 41 in the track-width direction (in the X direction in the drawing) at the front surface of the magnetic head. In this embodiment, this track width Tw can be defined within the range of 0.1 to 0.3 μm.

The four-layer structure 52 can form a linear magnetic path from the protruding layer 31 to the back gap layer 32. This magnetic path, therefore, is shorter than that formed by the four-layer structure 52 curved under the upper core layer 42.

Even if, therefore, the coil layer 54 has a smaller number of turns, the magnetic head can retain its recording characteristics. A smaller number of turns can decrease the coil resistance, thereby preventing heat generation in the magnetic head during operation and, for example, the protrusion of the gap layer 40 from the front surface of the magnetic head.

In addition, a smaller number of turns can increase the inversion speed of magnetic fields, providing a magnetic head having excellent high-frequency characteristics.

The coil-insulating layer 35 may be made of an inorganic insulating material to decrease the thermal expansion coefficient of the magnetic head.

In this magnetic head, the lower magnetic pole layers 39, the gap layers 40, and the upper magnetic pole layer 41 function as magnetic pole layers on the front side of the gap-depth defining layer 36 and function as yoke layers on the rear side of the gap-depth defining layer 36.

In other words, the lower magnetic pole layers 39, the gap layers 40, and the upper magnetic pole layer 41 are functionally separated by the gap-depth defining layer 36. This functional separation can provide an improvement in the recording characteristics of the magnetic head.

According to this embodiment, the four-layer structure 52 may be easily formed by plating with the same frame. Such a four-layer structure 52 allows precise definition of a predetermined track width Tw with no reduction by, for example, trimming.

This four-layer structure 52, which is formed with the same frame, can have the same planar shape.

Figure 9:
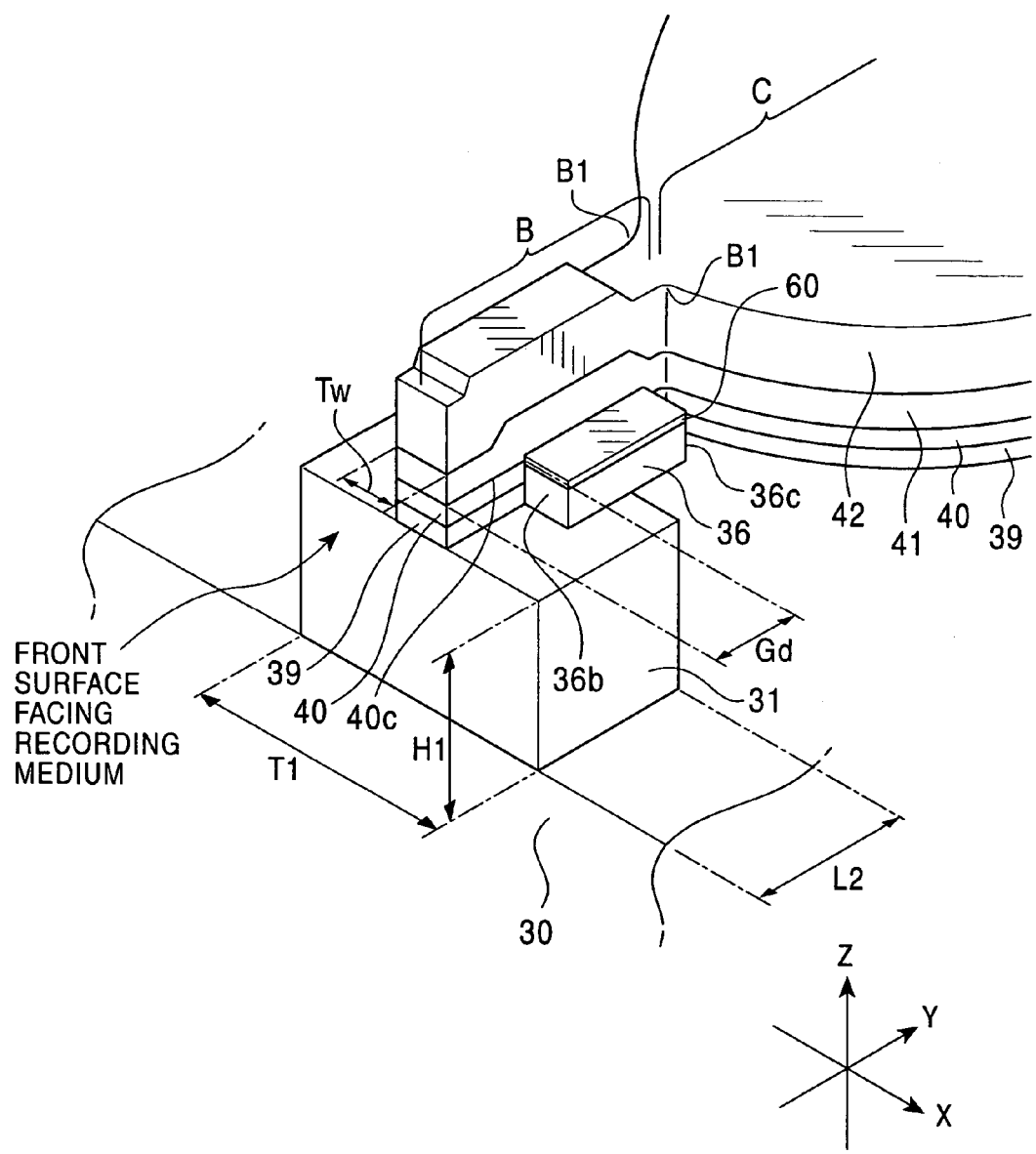
FIG. 9 is a partial perspective view of the magnetic head in FIG. 1.

FIG. 9 is a perspective view of an example of this four-layer structure 52. In FIG. 9, the four-layer structure 52 has a planar shape consisting of a front portion B and a rear portion C. The front portion B extends from the front surface of the magnetic head in the height direction (in the Y direction in the drawings) with a constant width; on the other hand, the rear portion C extends from side base ends B1 of the front portion B in the height direction with a gradually increasing width. The track width Tw, as described above, is defined by the width of the upper magnetic pole layer 41 in the track-width direction (in the X direction in the drawings) at the front surface of the magnetic head.

The front portion B may have a width gradually increasing from the front surface of the magnetic head in the height direction. Then, the rear portion C has a width further increasing from the side base ends B1 of the front portion B in the height direction.

The side base ends B1, which are positioned closer to the rear of the magnetic head than the rear end surface 36c of the gap-depth defining layer 36 in FIG. 9, may be positioned above the gap-depth defining layer 36.

As shown in FIG. 9, the gap depth is defined by a length of the top surface 40c of the gap layer 40 on the front side from the front surface of the magnetic head to the gap-depth defining layer 36 in the height direction (in the Y direction in the drawings). To define a proper gap depth, preferably, the gap layer 40 on the front side is separated from that on the rear side by the gap-depth defining layer 36. The gap depth is preferably about 0.3 to 2.0 μm. Therefore, the front end surface 36b of the gap-depth defining layer 36 is preferably positioned such that the minimum length L1 (see FIG. 1) from the front surface of the magnetic head to the front end surface 36b of the gap-depth defining layer 36 ranges from about 0.3 to about 2.0 μm.

The lower and upper magnetic pole layers 39 and 41 will now be described. The lower and upper magnetic pole layers 39 and 41, which are opposed to the gap layer 40, are preferably made of a material having a higher saturation magnetic flux density Bs than the lower and upper core layers 30 and 42, the protruding layer 31, and the back gap layer 32. Such lower and upper magnetic pole layers 39 and 41 can concentrate a recording magnetic field around the gap layers 40 to improve the recording density.

The lower and upper magnetic pole layers 39 and 41 extend beyond the gap-depth defining layer 36 in the height direction, providing an area with high saturation magnetic flux density Bs near the coil layer 54. This area improves the magnetic flux efficiency to provide a magnetic head having excellent recording characteristics.

The lower and upper magnetic pole layers 39 and 41 may be made of a magnetic material such as Ni—Fe alloy, Co—Fe alloy, and Co—Fe—Ni alloy. The composition of this magnetic material may be adjusted to provide a higher saturation magnetic flux density Bs, which is 1.8 T or more in this embodiment.

The lower and upper magnetic pole layers 39 and 41 may each be formed in a monolayer or a multilayer.

The gap layers 40 will now be described. The gap layers 40 are formed on the lower magnetic pole layers 39 by plating with a nonmagnetic metal, which is preferably at least one material selected from the group consisting of NiP, Ni—Pd alloy, Ni—W alloy, Ni—Mo alloy, Ni—Rh alloy, Au, Pt, Rh, Pd, Ru, and Cr. The gap layers 40 may be formed in a monolayer or a multilayer.

The gap layers 40 of NiP have advantages such as easy continuous plating, high thermal resistance, and good adhesion to the lower and upper magnetic pole layers 39 and 41. In addition, such gap layers 40 can have a hardness equivalent to the lower and upper magnetic pole layers 39 and 41. The gap layers 40, therefore, can have an equivalent required processing amount to the lower and upper magnetic pole layers 39 and 41 during the processing of their front end surfaces facing the recording medium by, for example, ion milling, thereby improving the processability.

More preferably, the gap layers 40 are made of NiP containing phosphorus of 8% to 15% by weight to remain nonmagnetically stable against external factors such as heat generation. The composition of the gap layers 40 may be measured by, for example, X-ray spectroscopy in combination with scanning electron microscopy (SEM) or transmission electron microscopy (TEM) or wavelength dispersive X-ray spectroscopy.

The upper core layer 42 will now be described. The upper core layer 42 is formed together with the lower magnetic pole layer 39, the gap layer 40, and the upper magnetic pole layer 41 by plating. In addition, the upper core layer 42 has the same planar shape as these layers 39, 40, and 41. The upper core layer 42, having a predetermined planar shape, can be easily and precisely formed on the upper magnetic pole layer 41 because the upper magnetic pole layer 41 is substantially flat.

The upper core layer 42 may be made of, for example, the same magnetic material as the lower core layer 30 and may be formed in a monolayer or a multilayer.

This upper core layer 42, though not being essential, is preferably provided in the magnetic head. For layers having high saturation magnetic flux density, such as the lower and upper magnetic pole layers 39 and 41, it is difficult to provide a large thickness because of their slow growth in plating. On the other hand, the upper core layer 42 does not need high saturation magnetic flux density and, therefore, does not face tough plating conditions. The upper core layer 42 having a large thickness can improve the recording characteristics.

The upper core layer 42 has a thickness of about 1 to 3 μm. For reference, the lower magnetic pole layers 39, the gap layers 40, and the upper magnetic pole layer 41 have thicknesses of about 0.1 to 0.5 μm, about 0.05 to 0.15 μm, and about 0.1 to 1 μm, respectively.

The protruding layer 31 will now be described. In this embodiment, the protruding layer 31 is separated from the lower core layer 30 and magnetically connected to the lower core layer 30. The protruding layer 31 and the lower core layer 30 may be formed as an unseparated layer. The material for the protruding layer 31 may be the same as or different from the lower core layer 30. The protruding layer 31 may be formed in a monolayer or a multilayer.

In FIG. 9, the protruding layer 31 has a larger width T1 in the track-width direction (in the X direction in the drawing) at the surface facing the recording medium than the lower magnetic pole layer 39, the gap layer 40, the upper magnetic pole layer 41, and the upper core layer 42. This width T1 ranges from about 5 to about 30 μm; a length L2 of the protruding layer 31 in the height direction ranges from about 1.5 to about 3 μm; and a thickness H1 of the protruding layer 31 ranges from about 2.5 to about 4 μm.

The second and third seed layers 37 and 38 for forming the lower magnetic pole layers 39 will now be described. In FIG. 4, the second seed layer 37 extends on the protruding layer 31 from the front surface of the magnetic head in the height direction (in the Y direction in the drawings). The third seed layer 38 extends on the coil-insulating layer 35 and the back gap layer 32 from a position separated from the rear end surface of the second seed layer 37 in the height direction by a predetermined distance.

The gap-depth defining layer 36 bridges a space 61 between the second and third seed layers 37 and 38.

The lower magnetic pole layers 39 are formed on the second and third seed layers 37 and 38 by plating, and the gap layers 40 are formed on the lower magnetic pole layers 39 by plating.

The second and third seed layers 37 and 38 are separated by the space 61 to prevent magnetic loss, which leads to a deterioration in the recording characteristics. If these seed layers 37 and 38 are formed as an unseparated seed layer of a magnetic material, some flux passes through this unseparated seed layer, which is not the correct route, to leak out and result in magnetic loss. The gap-depth defining layer 36 can prevent such magnetic loss.

The third seed layer 38 may be made of a nonmagnetic metal such as copper while the second seed layer 37 needs to be made of a magnetic material. If the second seed layer 37, which is exposed in the front surface of the magnetic head, is made of a nonmagnetic metal, the second seed layer 37 acts as a pseudogap, resulting in a deterioration in the recording characteristics. On the other hand, the third seed layer 38, which is not exposed in the front surface of the magnetic head, does not have such a limitation.

The second seed layer 37 is not essential because the top surface 31a of the protruding layer 31 may function as a seed layer. The third seed layer 38 only needs to extend from the rear end surface 36c of the gap-depth defining layer 36 to the front end surface 32a of the back gap layer 32. Rather, the third seed layer 38 does not preferably overlap with the back gap layer 32 to prevent a magnetic loss. A part of the third seed layer 38 overlapping the back gap layer 32 may be removed before the formation of the lower magnetic pole layer 39. Alternatively, the third seed layer 38 may be formed so as not to overlap the back gap layer 32.

The second and third seed layers 37 and 38 may be formed at the same time. Then, a magnetic material is deposited onto the flat surface along the reference plane A by sputtering and is patterned by, for example, photolithography or ion milling to form the second and third seed layers 37 and 38.

Next, a method for manufacturing the magnetic head, mainly a process of forming the layers 30 to 42, will now be described with reference to FIGS. 10 to 16, which are longitudinal sectional views of the magnetic head in the manufacturing process.

Figure 10:
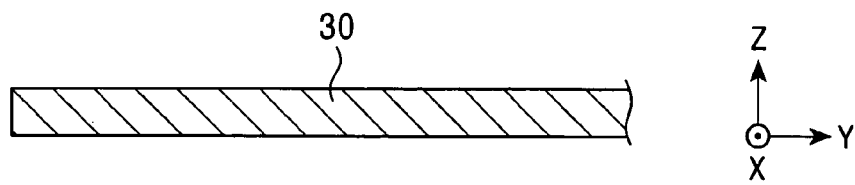
FIG. 10 illustrates a step of a method for manufacturing the magnetic head in FIG. 1.

Referring to FIG. 10, first, the lower core layer 30 of, for example, Ni—Fe alloy is formed by plating and polished to form a flat top surface.

Figure 11:
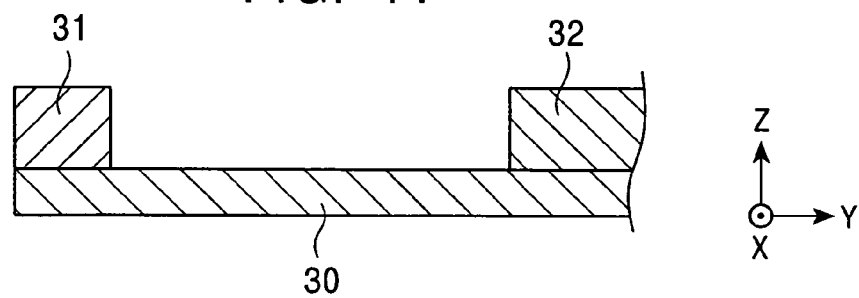
FIG. 11 illustrates a step subsequent to the step in FIG. 10.

Referring to FIG. 11, the protruding layer 31 and the back gap layer 32 are formed on the flat top surface of the lower core layer 30. Specifically, a resist is exposed and developed to form a pattern, which is filled with a magnetic material layer by, for example, plating. This resist is then removed to form the protruding layer 31 and the back gap layer 32.

The protruding layer 31 and the back gap layer 32 are formed such that their top surfaces are aligned at substantially the same level in the thickness direction.

Figure 12:
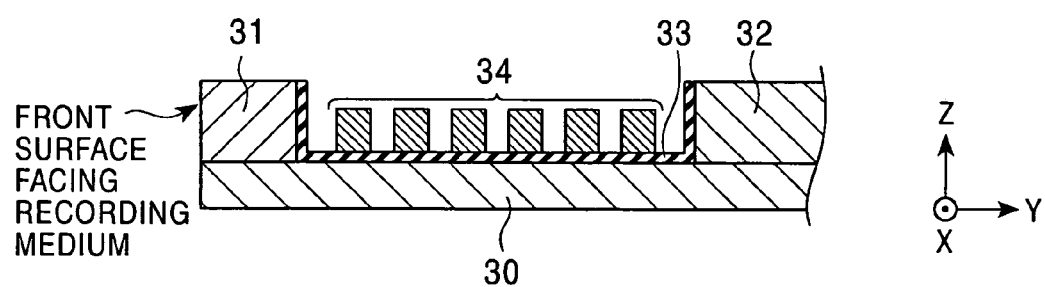
FIG. 12 illustrates a step subsequent to the step in FIG. 11.

Referring to FIG. 12, the coil-insulating seed layer 33 of an insulating material such as $Al_2O_3$ and $SiO_2$ is formed in the space surrounded by the lower core layer 30, the protruding layer 31, and the back gap layer 32 by, for example, sputtering. Then, the first coil segments 34 crossing the height direction are formed on this coil-insulating seed layer 33 by plating with a nonmagnetic material such as copper. The connections 51 in FIGS. 2 and 3 are formed at the same time.

Figure 13:
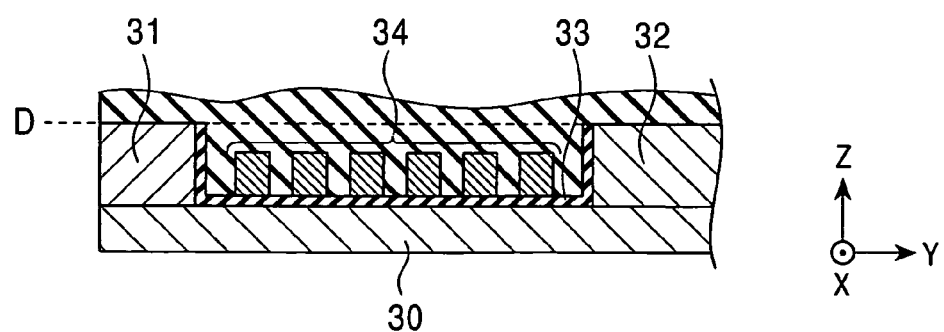
FIG. 13 illustrates a step subsequent to the step in FIG. 12.

Referring to FIG. 13, the coil-insulating layer 35 of, for example, $Al_2O_3$ is formed over the first coil segments 34, the protruding layer 31, and the back gap layer 32 by, for example, sputtering.

Figure 14:
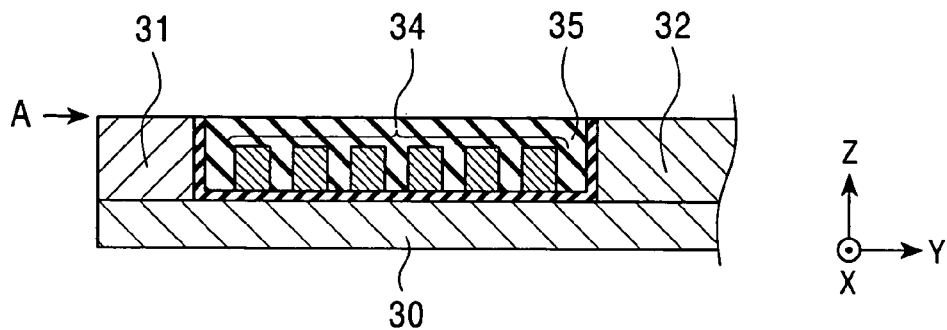
FIG. 14 illustrates a step subsequent to the step in FIG. 13.

This coil-insulating layer 35 is trimmed to line D—D in parallel to the X-Y plane by, for example, chemical mechanical polishing (CMP). FIG. 14 shows the trimmed coil-insulating layer 35.

In FIG. 14, the top surfaces of the protruding layer 31, the coil-insulating layer 35, and the back gap layer 32 form the flat surface along the reference plane A. The first coil segments 34 are completely embedded in the coil-insulating layer 35.

Figure 15:
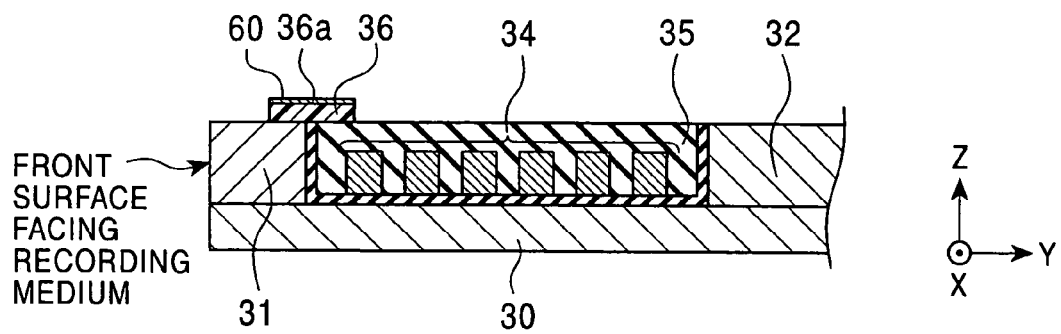
FIG. 15 illustrates a step subsequent to the step in FIG. 14.

Referring to FIG. 15, after the second and third seed layers 37 and 38 are formed on this flat surface by, for example, sputtering, the gap-depth defining layer 36 is formed away from the front surface of the magnetic head in the height direction (in the Y direction in the drawings) by a predetermined distance. This gap-depth defining layer 36 bridges the space 61 between the second and third seed layers 37 and 38.

As described above, the third seed layer 38 may be made of a nonmagnetic metal and need not overlap with the back gap layer 32. If a part of the third seed layer 38 overlaps with the back gap layer 32, this part may be removed by etching. In addition, the second seed layer 37 is not essential and, if formed, needs to be made of a magnetic material. The third seed layer 38 may be made of either magnetic or nonmagnetic material.

Figure 16:
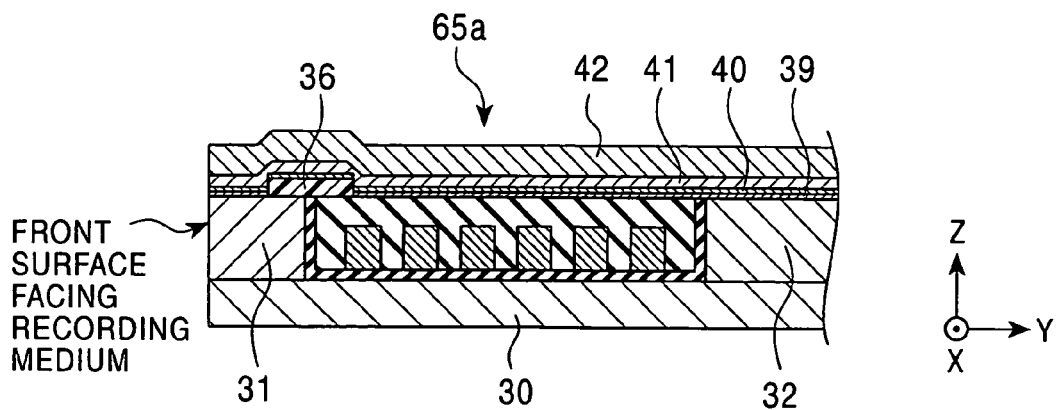
FIG. 16 illustrates a step subsequent to the step in FIG. 15.

Referring to FIG. 16, after the formation of a resist layer having a pattern of, for example, the front portion B and the rear portion C in FIG. 9, the lower magnetic pole layers 39, the gap layers 40, the upper magnetic pole layer 41, and the upper core layer 42, in this order, are continuously formed in this pattern by plating.

As described above, the lower magnetic pole layers 39, the gap layers 40, the upper magnetic pole layer 41, and the upper core layer 42 have the planar shape consisting of the front portion B and the rear portion C. The front portion B has a small width and extends from the front surface of the magnetic head in the height direction (in the Y direction in the drawings). On the other hand, the rear portion C has a width gradually increasing from the side base ends B1 of the front portion B in the height direction. The track width Tw is defined by the width of the upper magnetic pole layer 41 in the track-width direction (in the X direction in the drawings) at the front surface of the magnetic head. After the formation of these layers 39, 40, 41, and 42, the resist layer is removed.

In this step, the lower magnetic pole layers 39 and the gap layers 40 are formed on the front and rear sides of the gap-depth defining layer 36 by plating. The upper magnetic pole layer 41 is then formed on these layers 39 and 40 by plating, extending from the front surface of the magnetic head to the top surface of the back gap layer 32. The upper core layer 42 is continuously formed on the upper magnetic pole layer 41 by plating.

Originally, the lower magnetic pole layers 39, the gap layers 40, and the upper magnetic pole layer 41 are required to constitute a magnetic pole. Therefore, in general, only the lower magnetic pole layer 39 and gap layer 40 on the front side of the gap-depth defining layer 36 are formed, and the upper magnetic pole layer 41 only needs to extend from the front surface of the magnetic head onto the gap-depth defining layer 36.

In this step, however, the lower magnetic pole layers 39 and the gap layers 40 are formed on the front and rear sides of the gap-depth defining layer 36, and the upper magnetic pole layer 41 extends to the back gap layer 32. The lower magnetic pole layer 39, the gap layer 40, and the upper magnetic pole layer 41 on the rear side of the gap-depth defining layer 36 function as a yoke, as does the upper core layer 42.

Thus, the upper core layer 42 can be continuously formed on the lower magnetic pole layers 39, the gap layers 40, and the upper magnetic pole layer 41 by plating.

If, as described above, the lower magnetic pole layer 39, the gap layer 40, and the upper magnetic pole layer 41 are not formed on the rear side of the gap-depth defining layer, an additional layer, such as a coil layer and an insulating layer, is generally formed on the rear side of the gap-depth defining layer 36. The entire top surfaces of the upper magnetic pole layer 41 and such an additional layer require flattening by, for example, CMP to form the upper core layer 42. The step in FIG. 16, however, does not require such flattening, because the lower magnetic pole layers 39 and the gap layers 40 are formed on the front and rear sides and the upper magnetic pole layer 41 extends to the back gap layer 32. The upper core layer 42, therefore, can be directly formed on the upper magnetic pole layer 41 by plating. Thus, with such a simpler step, the upper core layer 42 having a predetermined shape can be readily and precisely formed on the flat top surface of the upper magnetic pole layer 41.

In the step in FIG. 16, the lower and upper magnetic pole layers 39 and 41 may be made of a material having a higher saturation magnetic flux density than the lower and upper core layers 30 and 42, the protruding layer 31, and the back gap layer 32. Such magnetic pole layers 39 and 41 can collect a recording magnetic field around the gap layers 40 to increase the recording density. In addition, such magnetic pole layers 39 and 41 can provide an area with high saturation magnetic flux density near the coil layer 54 to increase the magnetic flux efficiency, improving the recording characteristics.

The gap layers 40, which are formed by plating, are preferably made of a nonmagnetic metal that can be used in plating. More preferably, the gap layers 40 are made of at least one material selected from the group consisting of NiP, Ni—Pd alloy, Ni—W alloy, Ni—Mo alloy, Ni—Rh alloy, Au, Pt, Rh, Pd, Ru, and Cr. These materials allow the gap layers 40 to be nonmagnetic and to have a predetermined thickness.

The gap layers 40 of NiP have advantages such as easy plating, high thermal resistance, and good adhesion to the upper magnetic pole layer 41. More preferably, the gap layers 40 are made of NiP containing phosphorus of 8% to 15% by weight to remain nonmagnetically stable against external factors such as heat generation. The composition of the gap layers 40 may be measured by, for example, X-ray spectroscopy in combination with scanning electron microscopy (SEM) or transmission electron microscopy (TEM) or wavelength dispersive X-ray spectroscopy.

The insulating layer 43 of an insulating material such as $Al_2O_3$ is formed on the upper core layer 42. The second coil segments 44 crossing the height direction are formed on this insulating layer 43.

When the second coil segments 44 are formed, as shown in FIGS. 2 and 3, the ends 34a of the first coil segments 34 and the ends 44a of the second coil segments 44, which are opposed in the thickness direction of the four-layer structure 52 (in the Z direction in the drawings), are connected through the connections 51.

The connections 51 connect the first and second coil segments 34 and 44 to form the coil layer 54 in a helical shape. Before the formation of the second coil segments 44, as shown in FIG. 2, the layer 53 of, for example, a resist is formed to cover the corners of the four-layer structure 52. The lead layer 56 is formed together with the second coil segments 44, and then the protective layer 55 of, for example, $Al_2O_3$ is formed, finally providing the magnetic head in FIG. 1.

Next, a process of forming the gap-depth defining layer 36 and the first, second, and third seed layers 60, 37, and 38 will now be described with reference to FIGS. 17 to 22.

Figure 17:
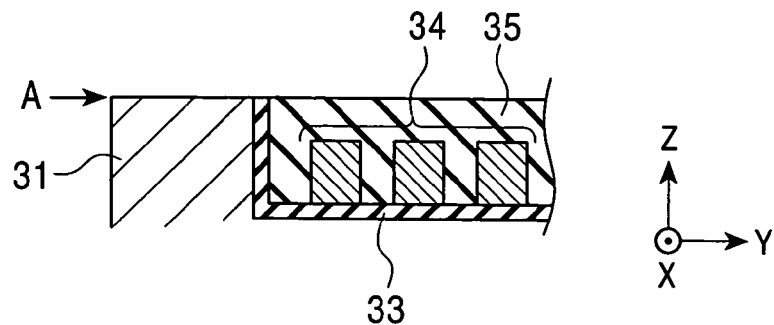
FIG. 17 illustrates a step of a process of preparing a gap-depth defining layer and its periphery in the magnetic head in FIG. 1.

FIG. 17 is an enlarged partial sectional view of the protruding layer 31, the coil-insulating layer 35, and their periphery after the step in FIG. 14.

Figure 18:
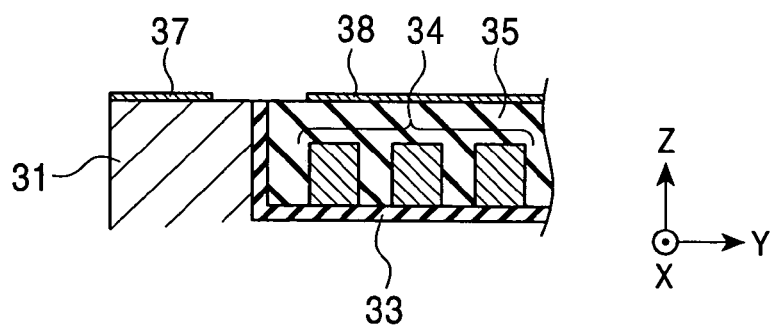
FIG. 18 illustrates a step subsequent to the step in FIG. 17.

In a step in FIG. 18, the second seed layer 37 is deposited on the protruding layer 31 and the third seed layer 38 is deposited on the coil-insulating layer 35 and the back gap layer 32 by, for example, sputtering. As described above, these seed layers 37 and 38 are spaced by a predetermined distance in the height direction.

The second and third seed layers 37 and 38 are made of, for example, $Ni_{40}Fe_{60}$, $Fe_{70}Co_{30}$, or $Fe_{60}Co_{30}Ni_{10}$, which have saturation magnetic flux densities of about 1.9 T, about 2.3 T, and about 2.1 T, respectively. These seed layers 37 and 38 may be formed by sputtering to provide a sufficient corrosion resistance. The third seed layer 38 may be made of a nonmagnetic metal.

Figure 19:
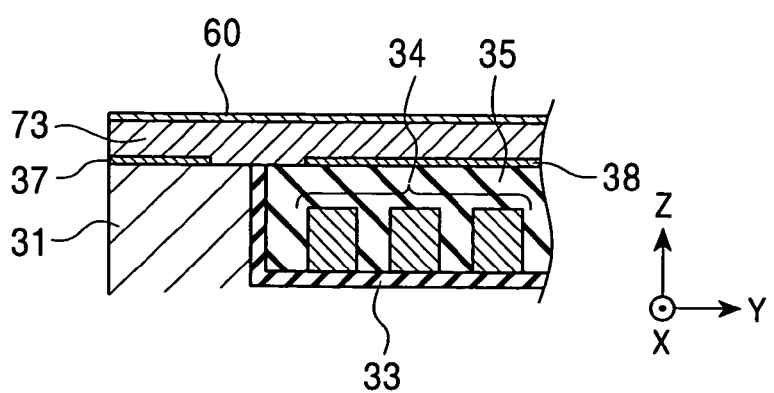
FIG. 19 illustrates a step subsequent to the step in FIG. 18.

Referring to FIG. 19, a nonmagnetic material layer 73 is deposited on the top surfaces of the protruding layer 31, the coil-insulating layer 35, and the back gap layer 32, and then the first seed layer 60 is formed on this nonmagnetic material layer 73. The nonmagnetic material layer 73 will be patterned to form the gap-depth defining layer 36 later.

This nonmagnetic material layer 73 is formed by sputtering with an inorganic material that can be used for reactive ion etching, such as $SiO_2$, SiN, $Ta_2O_5$, and $Si_3N_4$. Alternatively, a resist may be applied and cured by heating to form the nonmagnetic material layer 73.

The first seed layer 60 is exemplified by nonmagnetic films such as Ti films and Ti/Au laminated films; and magnetic films such as FeCo films and FeCo/Ti/Au laminated films. Among them, nonmagnetic films are preferred because nonmagnetic films have higher corrosion resistance to a plating solution than magnetic films.

The first seed layer 60 has a thickness of 100 to 200 Å while the nonmagnetic material layer 73 has a thickness of 0.2 to 0.45 µm. The total thickness of these layers 60 and 73 is preferably 0.5 µm or less.

Figure 20:
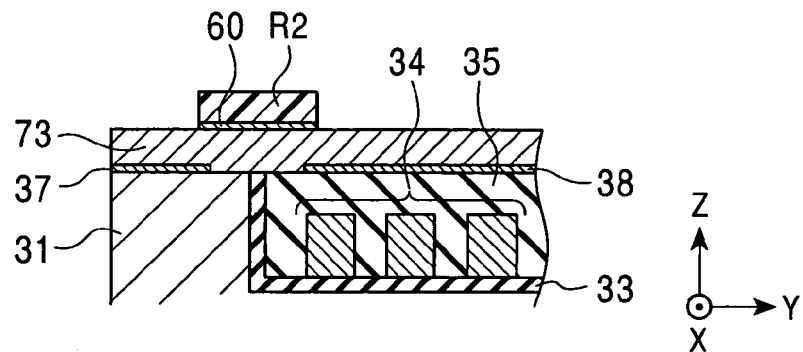
FIG. 20 illustrates a step subsequent to the step in FIG. 19.

Referring to FIG. 20, a resist layer R2 is formed on the first seed layer 60 and is patterned to remain at an area separated from the front surface of the magnetic head by a predetermined distance. Then, uncovered parts of the first seed layer 60 are removed by ion milling or reactive ion etching to form the first seed layer 60 having the same planar shape as the gap-depth defining layer 36.

In FIG. 20, the rear end surface of the first seed layer 60 overlaps with the third seed layer 38 while the front end surface of the first seed layer 60 overlaps with the second seed layer 37.

Figure 21:
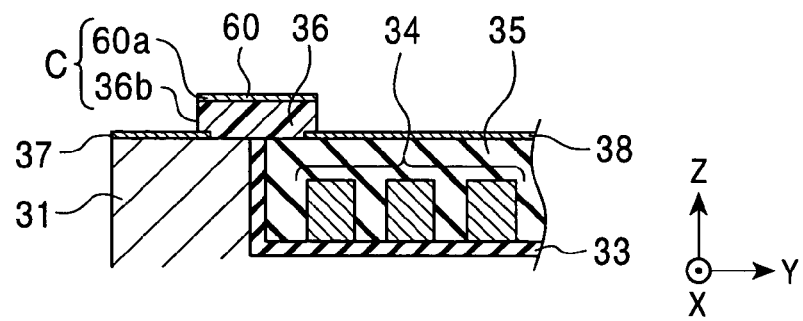
FIG. 21 illustrates a step subsequent to the step in FIG. 20.

Referring to FIG. 21, the resist layer R2 is removed, and then uncovered parts of the nonmagnetic material layer 73 are removed to form the gap-depth defining layer 36, which is the remaining nonmagnetic material layer 73.

If the nonmagnetic material layer 73 is made of a material selected from the group consisting of $SiO_2$, SiN, $Ta_2O_5$, and $Si_3N_4$, the uncovered parts of the nonmagnetic material layer 73 may be removed by reactive ion etching with $CF_4$. On the other hand, if the nonmagnetic material layer 73 is a resist layer cured by heating, the uncovered parts of the nonmagnetic material layer 73 may be removed by reactive ion etching with $O_2$. Such reactive ion etching provides the gap-depth defining layer 36 having the front end surface 36b perpendicular to the top surface 31a of the protruding layer 31.

Thus, the gap-depth defining layer 36 is formed to bridge the second and third seed layers 37 and 38.

After the formation of the gap-depth defining layer 36, the exposed top surfaces of the second and third seed layers 37 and 38 are precleaned, that is, trimmed by tens of angstroms by ion milling at an incident angle of 30° to 60° from the normal direction to these top surfaces.

Figure 22:
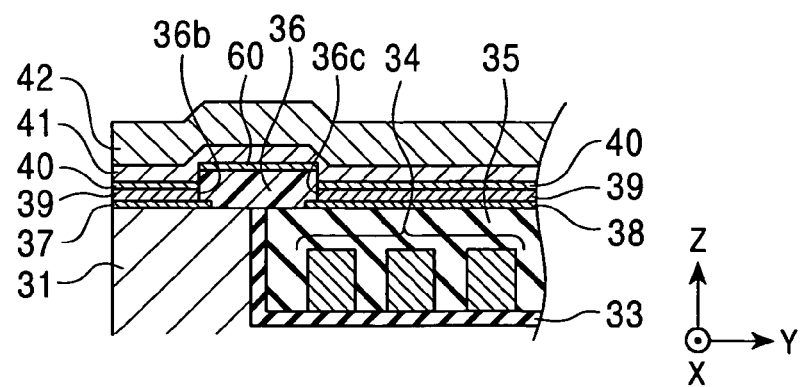
FIG. 22 illustrates a step subsequent to the step in FIG. 21.

Referring to FIG. 22, after the precleaning, the lower magnetic pole layers 39, the gap layers 40, the upper magnetic pole layer 41, and the upper core layer 42 are continuously formed by plating.

The lower magnetic pole layer 39 and the gap layer 40 on the front side are formed on the second seed layer 37 such that their rear end surfaces are in contact with the front end surface 36b of the gap-depth defining layer 36. On the other hand, the lower magnetic pole layer 39 and the gap layer 40 on the rear side are formed on the third seed layer 38. The upper magnetic pole layer 41 is formed such that it is connected to the gap layer 40 on the back gap layer 32 through the top surface of the gap layer 40 on the protruding layer 31 and the top surface 36a of the gap-depth defining layer 36.

According to the manufacturing method described above, the nonmagnetic material layer 73 is processed to form the gap-depth defining layer 36, with the patterned first seed layer 60 used as a mask. Therefore, the first seed layer 60 can cover the entire top surface 36a of the gap-depth defining layer 36.

Such a first seed layer 60 allows reliable formation of the upper magnetic pole layer 41 over the first seed layer 60, providing a magnetic head having stable recording characteristics.

The rear end surfaces of the lower magnetic pole layer 39 and the gap layer 40 on the front side are in contact with the front end surface 36b of the gap-depth defining layer 36. The upper magnetic pole layer 41, which is formed on the gap layers 40, may be allowed to grow by plating from a level closer to the first seed layer 60. Thus, the upper magnetic pole layer 41 can reliably reach the first seed layer 60 and can be readily formed on the gap-depth defining layer 36, providing a magnetic head having stable recording characteristics.

The gap-depth defining layer 36 is formed with the first seed layer 60 as a mask. Therefore, the front end surfaces 36b and 60a of the gap-depth defining layer 36 and the first seed layer 60 form a continuous surface, which indicates that these front end surfaces 36b and 60a are formed in the same flat plane or the same curved plane.

The front end surface 36b of the gap-depth defining layer 36 is perpendicular to the top surface 31a of the protruding layer 31. The upper magnetic pole layer 41, therefore, need not extend over the gap-depth defining layer 36 to reach the first seed layer 60. Thus, the upper magnetic pole layer 41 can reliably reach the first seed layer 60.

Figure 23:
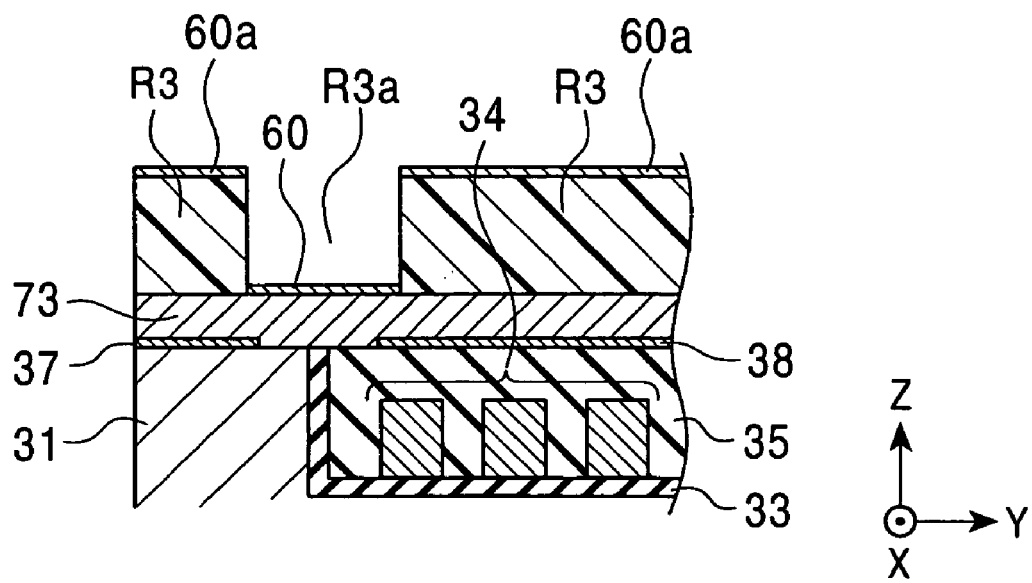
FIG. 23 illustrates a step of another process of preparing the gap-depth defining layer and its periphery in the magnetic head in FIG. 1.

Another process of forming the first seed layer 60 so as to cover the entire top surface 36a of the gap-depth defining layer 36 will now be described. FIG. 23 is a partial sectional view of the magnetic head in this process.

This process includes the same steps as the above-described process except for the steps after the formation of the nonmagnetic material layer 73. In this process, as shown in FIG. 23, a resist layer R3 is applied on the nonmagnetic material layer 73 instead of depositing the first seed layer 60 on the entire top surface of the nonmagnetic material layer 73. Then, an opening R3a is formed in the resist layer R3, and the first seed layer 60 is deposited on an exposed area of the first seed layer 60 in the opening R3a of the resist layer R3 by, for example, sputtering. At the same time, a layer 60a of the same material as the first seed layer 60 is formed on the top surface of the resist layer R3.

The opening R3a and the first seed layer 60 have the same planar shape as the gap-depth defining layer 36 to be formed.

The rear end surface of the first seed layer 60 overlaps with the third seed layer 38 while the front end surface of the first seed layer 60 overlaps with the second seed layer 37.

Figure 24:
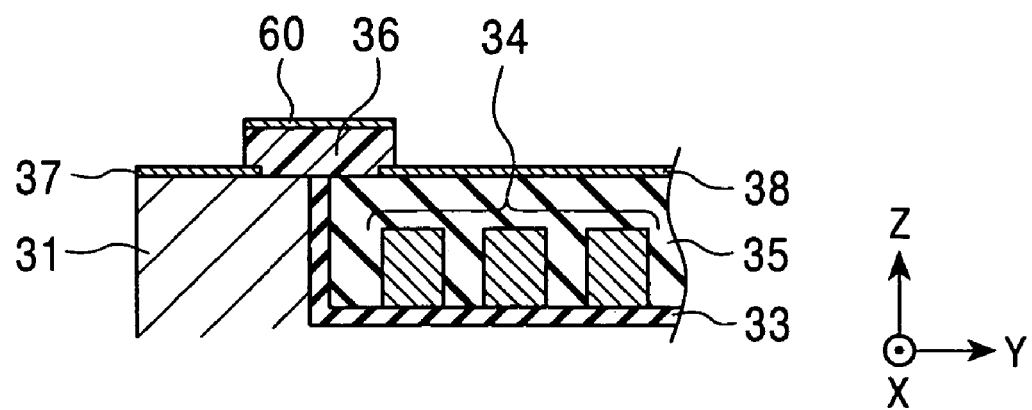
FIG. 24 illustrates a step subsequent to the step in FIG. 23.

Referring to FIG. 24, the resist layer R3 is removed, and then uncovered parts of the nonmagnetic material layer 73 are removed to form the gap-depth defining layer 36, which is the remaining nonmagnetic material layer 73.

If the nonmagnetic material layer 73 is made of a material selected from the group consisting of $SiO_2$, SiN, $Ta_2O_5$, and $Si_3N_4$, the uncovered parts of the nonmagnetic material layer 73 may be removed by reactive ion etching with $CF_4$. On the other hand, if the nonmagnetic material layer 73 is a resist layer cured by heating, the uncovered parts of the nonmagnetic material layer 73 may be removed by reactive ion etching with $O_2$. Such reactive ion etching provides the gap-depth defining layer 36 having the front end surface 36b perpendicular to the top surface 31a of the protruding layer 31.

Thus, the gap-depth defining layer 36 is formed to bridge the second and third seed layers 37 and 38.

Figure 25:
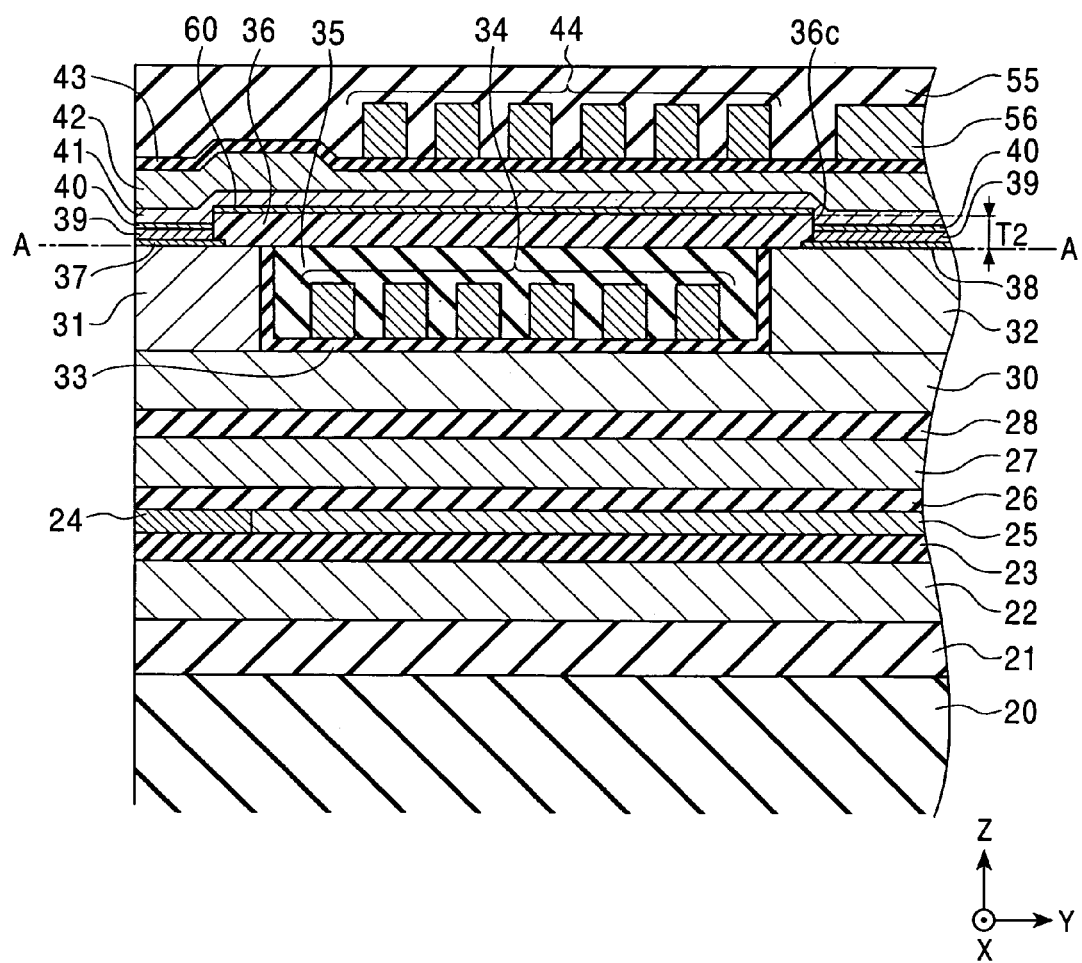
FIG. 25 is a longitudinal sectional view of a magnetic head according to a second embodiment of the present invention.

FIG. 25 is a partial longitudinal sectional view of a magnetic head according to a second embodiment of the present invention.

This magnetic head in FIG. 25 has a similar structure to that in FIG. 1. Therefore, the same parts as the magnetic head in FIGS. 1 to 4 will be indicated by the same numbers and not described in detail.

The magnetic head in FIG. 25 is different from that in FIG. 1 in that the rear end surface 36c of the gap-depth defining layer 36 is positioned on the back gap layer 32.

Alternatively, the rear end surface 36c of the gap-depth defining layer 36 may be positioned on the boundary between the top surface and front end surface of the back gap layer 32.

In this magnetic head, the gap-depth defining layer 36 overlaps entirely with the first coil segments 34 to strengthen the insulation between the first coil segments 34 and the upper magnetic pole layer 41.

The upper magnetic pole layer 41 can be insulated even if the first coil segments 34 extend to the reference plane A to be in contact with the bottom surface of the gap-depth defining layer 36. Such first coil segments 34 can have a larger sectional area and, therefore, a smaller resistance.

Figure 26:
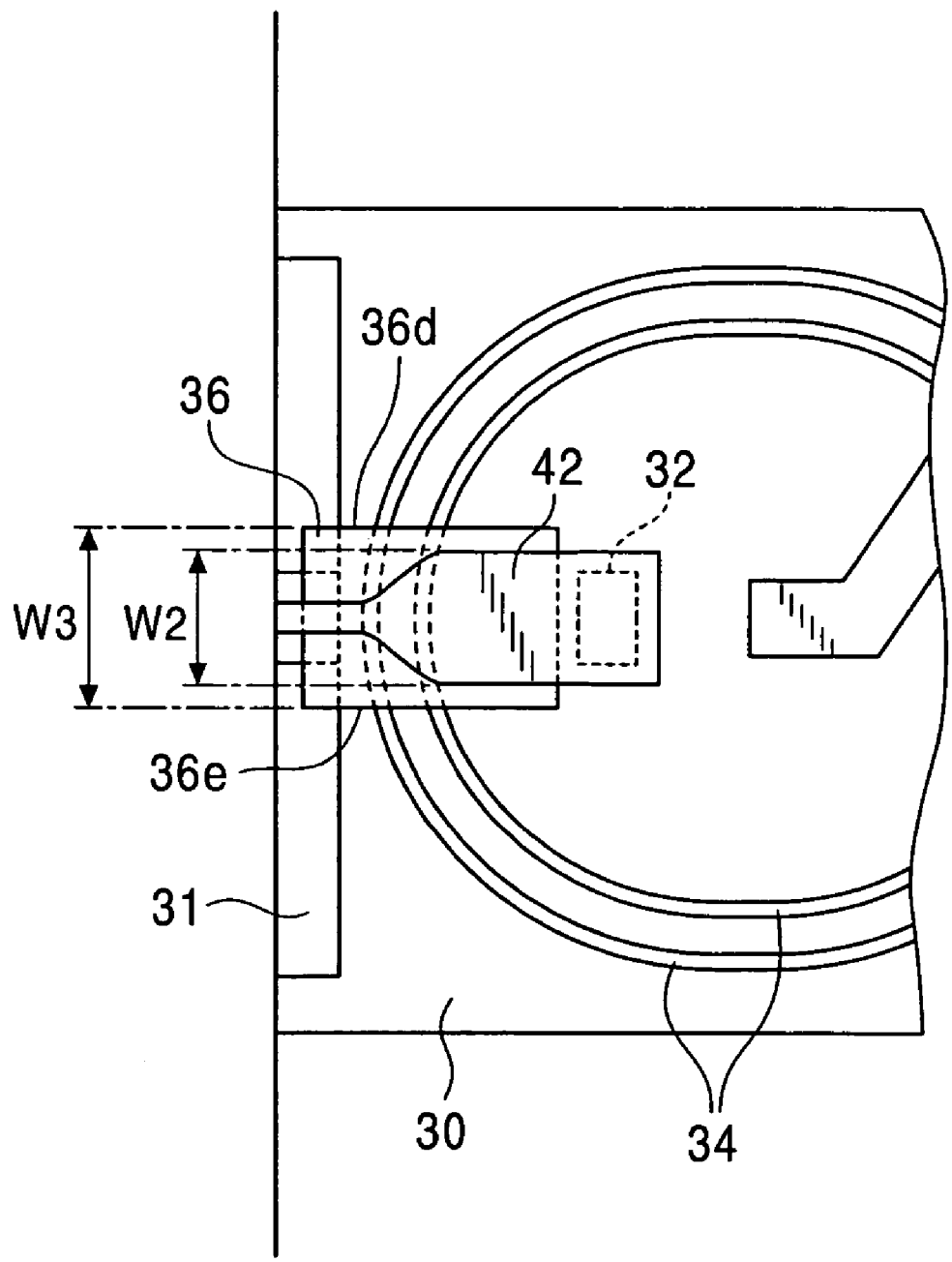
FIG. 26 is a partial plan view of the magnetic head in FIG. 25.

In this magnetic head, as shown in FIG. 26, the width W3 of the gap-depth defining layer 36 is preferably slightly larger than the maximum width W2 of the upper core layer 42 in the track-width direction. The reason for this will now be described.

A thickness T2 of the gap-depth defining layer 36, on which the magnetic pole layer 41 is formed, results in steps on the upper magnetic pole layer 41. The upper core layer 42 is formed on the upper magnetic pole layer 41 with a seed layer that is not shown in the drawings disposed therebetween. Therefore, the steps on the upper magnetic pole layer 41 are also formed on the upper core layer 42. Then, if the width W3 of the gap-depth defining layer 36 is smaller than the maximum width W2 of the upper core layer 42 to be formed, the upper magnetic pole layer 41 causes two steps extending in the height direction along side edges 36d and 36e and a step extending in the track-width direction along the rear end surface 36c of the gap-depth defining layer 36. These steps readily impair the seed layer for forming the upper core layer 42 to make it difficult to reliably form the upper core layer 42 by plating.

On the other hand, if the width W3 of the gap-depth defining layer 36 is larger than the maximum width W2 of the upper core layer 42 to be formed, the side edges 36d and 36e of the gap-depth defining layer 36 are positioned outside those of the upper magnetic pole layer 41. Thus, the upper magnetic pole layer 41 cause no step extending in the height direction, allowing reliable formation of the upper core layer 42 and, therefore, improving the quality of the magnetic head.

The rear end surface 36c of the gap-depth defining layer 36 may be positioned on the coil-insulating layer 35.

Figure 27:
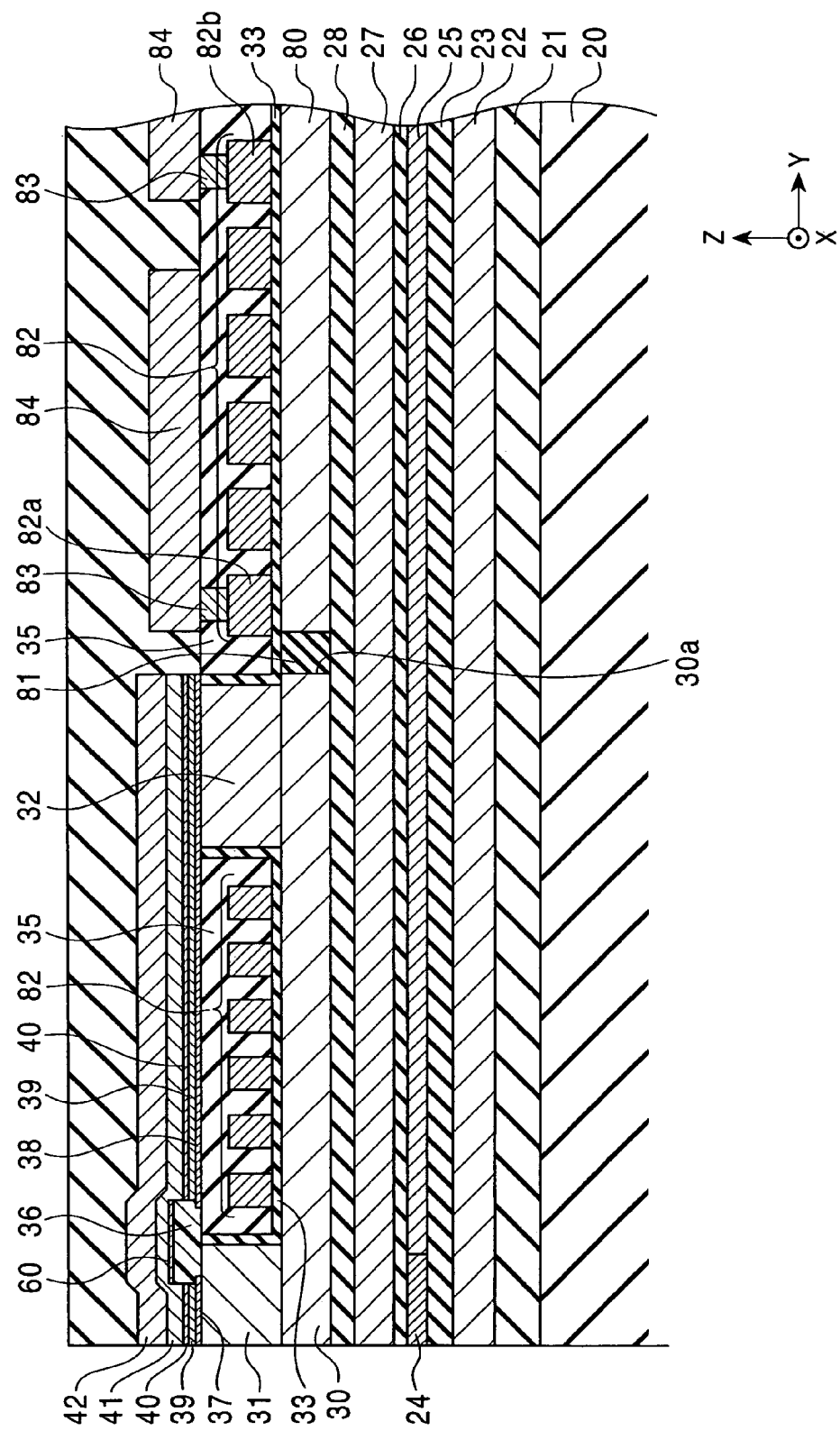
FIG. 27 is a longitudinal sectional view of a magnetic head according to a third embodiment of the present invention.
Figure 28:
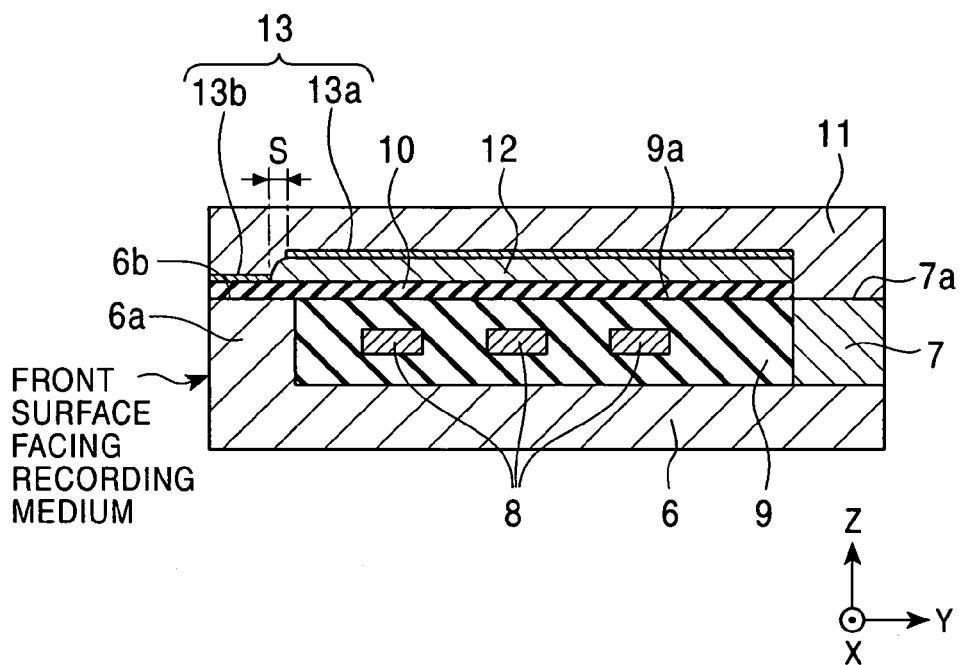
FIG. 28 is a partial longitudinal sectional view of a known magnetic head.
Figure 29:
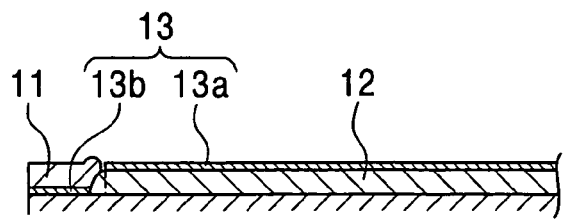
FIG. 29 is an enlarged partial longitudinal sectional view of the known magnetic head.

FIG. 27 is a partial longitudinal sectional view of a magnetic head according to a third embodiment of the present invention. This magnetic head in FIG. 27 has a similar structure to that in FIG. 1. Therefore, the same parts as the magnetic head in FIGS. 1 to 4 will be indicated by the same numbers and not described in detail.

The magnetic head in FIG. 27 has a different coil layer 82 from that in FIG. 1.

This magnetic head includes a leveling layer 80 that has a top surface at the same level as that of the lower core layer 30 and that is disposed behind the lower core layer 30. The leveling layer 80 is separated from the rear end surface 30a of the lower core layer 30 by a predetermined distance. The space between the lower core layer 30 and the leveling layer 80 is filled with a nonmagnetic layer 81 made of, for example, $Al_2O_3$. The lower core layer 30, the leveling layer 80, and the nonmagnetic layer 81 form a continuous, flat top surface.

The coil-insulating seed layer 33 is formed on the lower core layer 30 and the leveling layer 80. The coil layer 82, which surrounds the back gap layer 32, is formed on the coil-insulating seed layer 33.

Segments of the coil layer 82 in the front side of the back gap layer 32 are included in the space surrounded by the lower core layer 30, the protruding layer 31, and the back gap layer 32.

The spaces including the coil layer 82 are filled with the coil-insulating layer 35 of, for example, $Al_2O_3$. Extension layers 83 are formed on coil ends 82a and 82b and are connected to the lead layer 84. These extension layers 83 are made of, for example, the same magnetic material as the protruding layer 31 and the back gap layer 32.

Also in the magnetic heads in FIGS. 25 and 27, the first seed layer 60 covers the entire top surface of the gap-depth defining layer 36 and has a front end surface perpendicular to the top surface of the protruding layer 31.

The magnetic heads described above in detail are built in, for example, a magnetic head device for use in hard disc drives. These magnetic heads may be built in either floating magnetic head devices or contact magnetic head devices. Alternatively, these magnetic heads may be used in, for example, magnetic sensors.

What is claimed is:

1. A magnetic head comprising:
    a lower core layer extending from a front surface of the magnetic head in a height direction of the magnetic head, the front surface facing a recording medium;
    a protruding layer formed on the lower core layer, extending from the front surface of the magnetic head in the height direction by a predetermined length;
    a back gap layer formed on the lower core layer away from a rear end surface of the protruding layer in the height direction by a predetermined distance;
    a coil layer that is at least partially included in a space surrounded by the lower core layer, the protruding layer, and the back gap layer;
    a coil-insulating layer covering the coil layer;
    a gap-depth defining layer composed of a nonmagnetic material and disposed on a top surface of the protruding layer away from the front surface of the magnetic head in the height direction by a predetermined distance;
    a first seed layer composed of a metal, covering an entire top surface of the gap-depth defining layer;
    a lower magnetic pole layer formed on the protruding layer on the front side of the gap-depth defining layer, a rear end surface of the lower magnetic pole layer being in contact with a front end surface of the gap-depth defining layer;
    a gap layer formed on the lower magnetic pole layer, a rear end surface of the gap layer being in contact with the front end surface of the gap-depth defining layer; and
    an upper magnetic pole layer connected to the protruding layer via the first seed layer and the gap-depth defining layer.

2. The magnetic head according to claim 1, wherein the front end surfaces of the gap-depth defining layer and the first seed layer are continuous.

3. The magnetic head according to claim 1, wherein the front end surface of the gap-depth defining layer is perpendicular to the top surface of the protruding layer.

4. The magnetic head according to claim 1, wherein a total thickness of the gap-depth defining layer and the first seed layer is 0.5 µm or less.

5. The magnetic head according to claim 1, wherein the nonmagnetic material for the gap-depth defining layer is selected from the group consisting of $SiO_2$, SiN, $Ta_2O_5$, $Si_3N_4$, and a resist.

6. The magnetic head according to claim 1, wherein the top surfaces of the protruding layer, the coil-insulating layer, and the back gap layer are flat and continuous.

7. The magnetic head according to claim 1, further comprising another lower magnetic pole layer and another gap layer on the coil-insulating layer on a rear side of the gap-depth defining layer.

8. The magnetic head according to claim 1, wherein
the lower magnetic pole layer, the gap layer, and the upper magnetic pole layer have the same planar shape; and
a width of the upper magnetic pole layer at the front surface of the magnetic head determines a track width.

9. The magnetic head according to claim 1, wherein the rear end surface of the gap-depth defining layer is positioned on the protruding layer, the coil-insulating layer, or the back gap layer.

10. The magnetic head according to claim 1, wherein the lower magnetic pole layer, the gap layer, and the upper magnetic pole layer are formed by plating.

11. The magnetic head according to claim 1, further comprising an upper core layer on the upper magnetic pole layer, wherein
the upper core layer has the same planar shape as the upper magnetic pole layer; and
the upper and lower magnetic pole layers have a higher saturation magnetic flux density than the upper core layer.

12. The magnetic head according to claim 1, wherein the upper and lower magnetic pole layers have a higher saturation magnetic flux density than the lower core layer, the protruding layer, and the back gap layer.

13. The magnetic head according to claim 1, wherein the planar shape of the upper magnetic pole layer comprises:
a front portion having a width that corresponds to a track width at the front surface of the magnetic head and that remains constant or increases in the height direction; and
a rear portion having a width that increases from side base ends at a rear of the front portion in the height direction.

14. The magnetic head according to claim 1, further comprising a second seed layer composed of a magnetic material, the lower magnetic pole layer being formed on the protruding layer with the second seed layer disposed therebetween.

15. The magnetic head according to claim 14, further comprising a third seed layer extending from the rear end surface of the gap-depth defining layer onto the back gap layer, wherein
the second and third seed layers are separately formed;
the gap-depth defining layer is disposed between the second and third seed layers; and
another lower magnetic pole layer and another gap layer are formed on the third seed layer.

16. The magnetic head according to claim 15, wherein the third seed layer is composed of a nonmagnetic metal.

17. The magnetic head according to claim 1, wherein the coil layer surrounds the back gap layer on a plane parallel to a top surface of the lower core layer.

18. The magnetic head according to claim 1, wherein the coil layer helically surrounds the upper magnetic pole layer or the lower core layer.

19. A method for manufacturing a magnetic head, comprising:
(a) forming a lower core layer extending from a front surface of the magnetic head in a height direction of the magnetic head, the front surface of the magnetic head facing a recording medium;
(b) forming a coil-insulating seed layer on the lower core layer; and a coil layer at predetermined areas on the coil-insulating seed layer;
(c) forming a protruding layer and a back gap layer on the lower core layer before or after (b), the protruding layer extending from the front surface of the magnetic head to a position not in contact with a front end surface of the coil layer in the height direction; and the back gap layer being separated from a rear end surface of the protruding layer in the height direction such that the back gap layer is not in contact with the coil layer;
(d) covering the coil layer with a coil-insulating layer;
(e) forming a nonmagnetic material layer and a first seed layer on the protruding layer, the coil-insulating layer, and the back gap layer;
(f) patterning the first seed layer into a predetermined shape such that the first seed layer is separated from the front surface of the magnetic head by a predetermined distance;
(g) removing a portion of the nonmagnetic material layer uncovered by the patterned first seed layer to form a gap-depth defining layer; and
(h) forming a lower magnetic pole layer on the protruding layer on a front side of the gap-depth defining layer such that a rear end surface of the lower magnetic pole layer is in contact with a front end surface of the gap-depth defining layer; a gap layer on the lower magnetic pole layer such that a rear end surface of the gap layer is in contact with a front end surface of the gap-depth defining layer; and an upper magnetic pole layer connected to the protruding layer via the first seed layer and the gap-depth defining layer.

20. The method for manufacturing a magnetic head according to claim 19, wherein, at (g), the gap-depth defining layer and the first seed layer are formed such that the front end surfaces thereof are continuous.

21. The method for manufacturing a magnetic head according to claim 19, wherein, at (g), the gap-depth defining layer is formed such that the front end surface thereof is perpendicular to a top surface of the protruding layer.

22. The method for manufacturing a magnetic head according to claim 19, wherein,
at (e), the nonmagnetic material layer is formed with a material selected from the group consisting of $SiO_2$, SiN, $Ta_2O_5$, $Si_3N_4$, and a resist; and,
at (g), the uncovered portion of the nonmagnetic material layer is removed by reactive ion etching.

23. The method for manufacturing a magnetic head according to claim 19, wherein, at (e), the nonmagnetic material layer and the first seed layer are formed such that a total thickness thereof is 0.5 µm or less.

24. The method for manufacturing a magnetic head according to claim 19, wherein, at (d), top surfaces of the protruding layer, the coil-insulating layer, and the back gap layer are processed into a continuous, flat surface after the coil layer is covered with the coil-insulating layer.

25. The method for manufacturing a magnetic head according to claim 19, wherein, at (h), the lower magnetic pole layer, the gap layer, and the upper magnetic pole layer are continuously formed by plating.

26. The method for manufacturing a magnetic head according to claim 19, further comprising continuously forming an upper core layer on the upper magnetic pole layer by plating after (h), wherein, at (h), the upper and lower magnetic pole layers are formed with a material having a higher saturation magnetic flux density than the upper core layer.

27. The method for manufacturing a magnetic head according to claim 19, wherein, at (h), the upper and lower magnetic pole layers are formed with a material having a higher saturation magnetic flux density than the lower core layer, the protruding layer, and the back gap layer.

28. The method for manufacturing a magnetic head according to claim 19, wherein, at (h),
the upper magnetic pole layer is formed in a planar shape comprising a front portion having a width that corresponds to a track width at the front surface of the magnetic head and that remains constant or increases in the height direction; and a rear portion having a width that increases from side base ends at a rear of the front portion in the height direction; and
the lower magnetic pole layer, the gap layer, and the upper core layer are formed in the same planar shape as the upper magnetic pole layer.

29. The method for manufacturing a magnetic head according to claim 19, wherein, at (f), the first seed layer is patterned such that a rear end surface thereof is positioned above any one of the top surfaces of the protruding layer, the coil-insulating layer, and the back gap layer.

30. The method for manufacturing a magnetic head according to claim 19, further comprising forming a second seed layer of a magnetic material on the protruding layer between (d) and (e).

31. The method for manufacturing a magnetic head according to claim 19, further comprising between (d) and (e) forming a third seed layer such that the third seed layer is disposed between the rear end surface of the gap-depth defining layer and a front end surface of the back gap layer, wherein,
at (f), the first seed layer is patterned to remain above an area between the protruding layer and the third seed layer; and,
at (h), another lower magnetic pole layer and another gap layer are formed on the third seed layer by plating.

32. The method for manufacturing a magnetic head according to claim 31, wherein the third seed layer is formed with a nonmagnetic metal.

33. The method for manufacturing a magnetic head according to claim 19, wherein the coil layer is formed so as to surround the back gap layer on a plane parallel to a top surface of the lower core layer.

34. The method for manufacturing a magnetic head according to claim 19, wherein the coil layer is formed in a helical shape comprising:
first coil segments in a space surrounded by the lower core layer, the protruding layer, and the back gap layer, the first coil segments extending in a direction crossing the height direction; and
second coil segments on the upper magnetic pole layer with an insulating layer disposed therebetween, the second coil segments extending in the direction crossing the height direction, wherein
ends of the first coil segments opposed to ends of the second coil segments in a thickness direction of the upper magnetic pole layer are connected to the ends of the second coil segments.

35. The method for manufacturing a magnetic head according to claim 19, wherein the upper magnetic pole layer is formed to contact the back gap layer via the gap layer, the lower magnetic pole layer, and a third seed layer.

36. The magnetic head according to claim 1, wherein an upper magnetic pole layer is connected to the back gap layer via the gap layer, the lower magnetic pole layer, and a third seed layer.

* * * * *